US008499098B2

(12) United States Patent
Nakagawa et al.

(10) Patent No.: US 8,499,098 B2
(45) Date of Patent: Jul. 30, 2013

(54) STORAGE SYSTEM AND STORAGE SYSTEM COMMUNICATION PATH MANAGEMENT METHOD

(75) Inventors: Hirotaka Nakagawa, Sagamihara (JP); Satoshi Kaneko, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 817 days.

(21) Appl. No.: 12/665,039

(22) PCT Filed: Oct. 9, 2009

(86) PCT No.: PCT/JP2009/005302
§ 371 (c)(1),
(2), (4) Date: Dec. 17, 2009

(87) PCT Pub. No.: WO2011/042941
PCT Pub. Date: Apr. 14, 2011

(65) Prior Publication Data
US 2011/0179188 A1 Jul. 21, 2011

(51) Int. Cl.
*G06F 15/173* (2006.01)
(52) U.S. Cl.
USPC ............................ 709/240; 709/211; 709/214
(58) Field of Classification Search
None
See application file for complete search history.

(56) References Cited

U.S. PATENT DOCUMENTS

| 6,718,428 | B2 * | 4/2004 | Lee et al. ........................ 711/101 |
| 7,386,662 | B1 | 6/2008 | Kekre et al. |
| 7,475,131 | B2 * | 1/2009 | Achiwa et al. ................ 709/223 |
| 2005/0289310 | A1 | 12/2005 | Miki |
| 2006/0206603 | A1 * | 9/2006 | Rajan et al. .................... 709/223 |
| 2009/0031320 | A1 | 1/2009 | Nakagawa et al. |

FOREIGN PATENT DOCUMENTS

| EP | 1 727 033 A1 * | 11/2006 |
| JP | 2006-11874 A | 1/2006 |
| JP | 2009-32014 A | 2/2009 |

\* cited by examiner

*Primary Examiner* — Mohamed Ibrahim
(74) *Attorney, Agent, or Firm* — Mattingly & Malur, PC

(57) ABSTRACT

The present invention makes it possible to reassess respective host paths and reset priorities in accordance with the current state of a storage system. A management computer 400, in a case where either a failure or a configuration change occurs inside the storage system, assesses the respective host paths 501 through 506 in accordance with the status of a first communication network 500 and the status of a second communication network 600. The management computer 400, based on these assessment results, resets the priority of each host path. an alternate path program 112 of the host 100 are notified of the priorities, which have been set.

7 Claims, 18 Drawing Sheets

FIG.6

| DEVICE MANAGEMENT TABLE | | | 1000 |
|---|---|---|---|
| DEVICE ID | TYPE | MANAGEMENT PORT ADDRESS | |
| ST1 | STORAGE DEVICE | 192.168.5.11 | |
| ST2 | STORAGE DEVICE | 192.168.5.21 | |
| ST3 | EXTERNAL STORAGE DEVICE | 192.168.5.31 | |
| HOST1 | HOST COMPUTER | 192.168.12.8 | |
| 1001 | 1002 | 1003 | |

| VOLUME MANAGEMENT TABLE | | | |
|---|---|---|---|
| VOLUME ID | DEVICE TYPE | CAPACITY | SOURCE DEVICE ID |
| ST1.VOL001 | external | 10GB | ST3.VOL033 |
| ST1.VOL002 | Internal | 5GB | ST1.PG001 |
| ST2.VOL012 | external | 10GB | ST3.VOL033 |
| ST2.VOL003 | Internal | 5GB | ST2.PG022 |
| ST3.VOL033 | Internal | 10GB | ST3.PG003 |
| 1101 | 1102 | 1103 | 1104 |

FIG.8

|  | | COPY PAIR MANAGEMENT TABLE | | | 1200 |
|---|---|---|---|---|---|
| PAIR ID | COPY TYPE | PAIR STATUS | ACTIVE VOLUME ID | STANDBY VOLUME ID | |
| PAIR001 | cluster | pair | ST1.VOL001 | ST2.VOL012 | |
| PAIR002 | truecopy | pair | ST1.VOL002 | ST2.VOL003 | |

EXTERNAL PATH MANAGEMENT TABLE 1400

| EXTERNAL VOLUME ID | EXTERNAL PORT ID | TARGET PORT ID | SOURCE VOLUME ID |
|---|---|---|---|
| ST1.VOL001 | ST1.PORT11 | ST3.PORT02 | ST3.VOL033 |
| ST2.VOL002 | ST2.PORT22 | ST3.PORT03 | ST3.VOL033 |

1401    1402    1403    1404

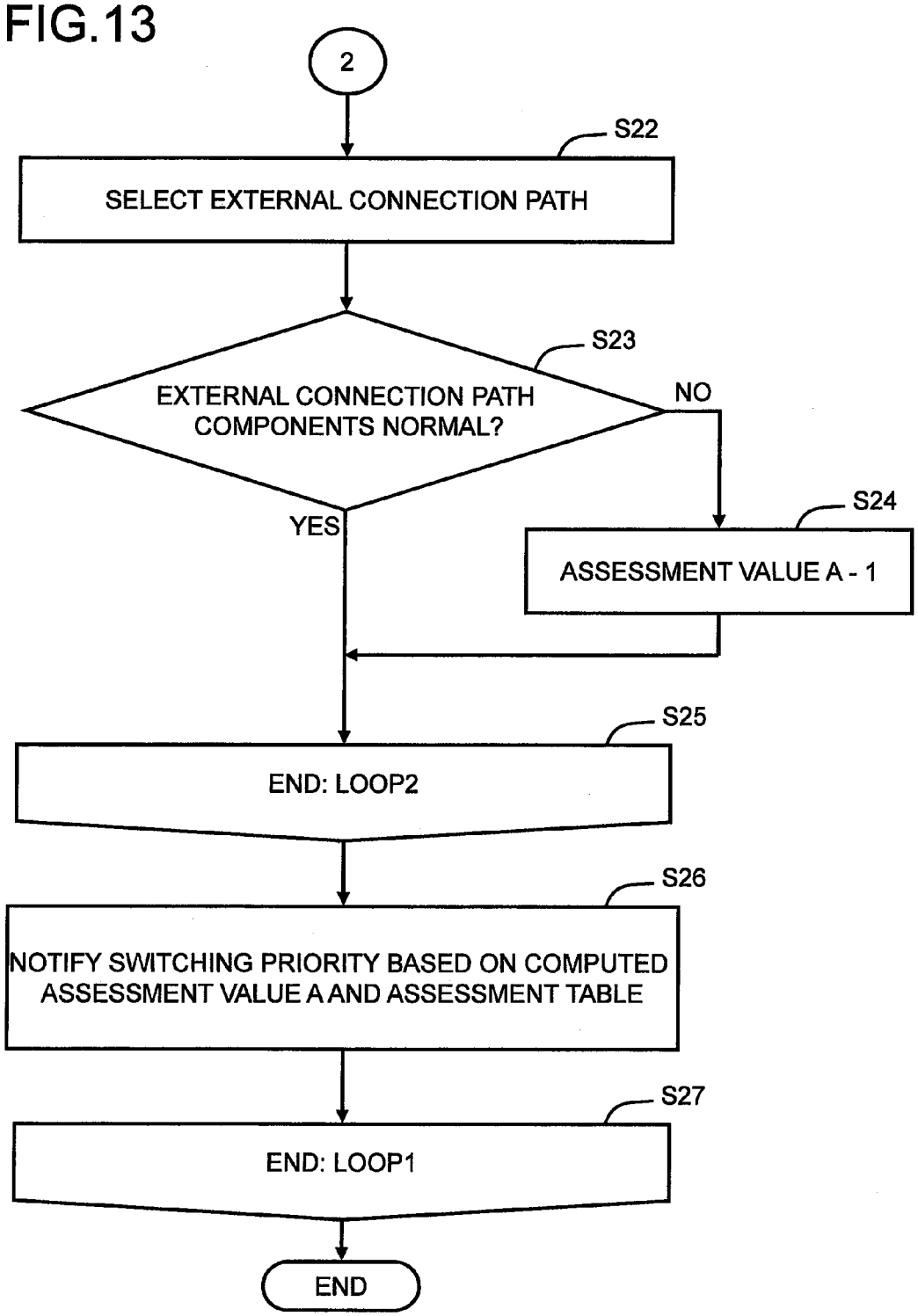

FIG.14

HOST PATH ASSESSMENT TABLE — 1500

| ASSESSMENT VALUE A | STATUS | SWITCHABLE | PRIORITY |
|---|---|---|---|
| 10 | ACTIVE SIDE, NORMAL | YES | 1 |
| 9 | ACTIVE SIDE, EXTERNAL CONNECTION PATH ABNORMAL | NO | BLOCKED |
| 7 | ACTIVE SIDE, HOST PATH ABNORMAL | NO | BLOCKED |
| 6 | ACTIVE SIDE, HOST PATH AND EXTERNAL CONNECTION PATH ABNORMAL | NO | BLOCKED |
| 5 | STANBY SIDE, NORMAL | YES | 2 |
| 4 | STANDBY SIDE, EXTERNAL CONNECTION PATH ABNORMAL | NO | BLOCKED |
| 2 | STANDBY SIDE, HOST PATH ABNORMAL | NO | BLOCKED |
| 1 | STANDBY SIDE, HOST PATH AND EXTERNAL CONNECTION PATH ABNORMAL | NO | BLOCKED |

1501  1502  1503  1504

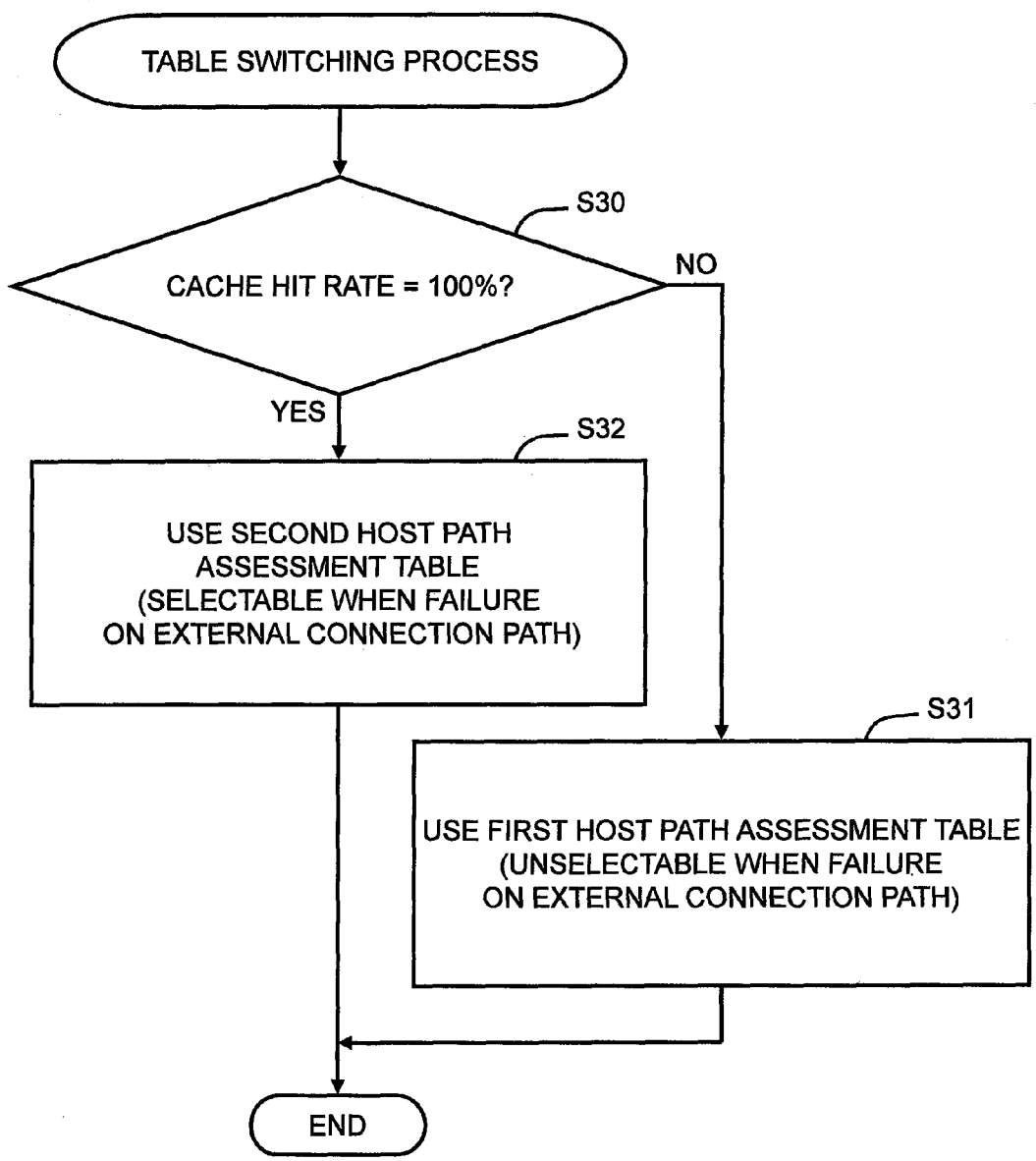

FIG.16

SECOND HOST PATH ASSESSMENT TABLE — 1500(2)

| ASSESSMENT VALUE A | STATUS | SWITCHABLE | PRIORITY |
|---|---|---|---|
| 10 | ACTIVE SIDE, NORMAL | YES | 1 |
| 9 | ACTIVE SIDE, EXTERNAL CONNECTION PATH ABNORMAL | YES | 2 |
| 7 | ACTIVE SIDE, HOST PATH ABNORMAL | NO | BLOCKED |
| 6 | ACTIVE SIDE, HOST PATH AND EXTERNAL CONNECTION PATH ABNORMAL | NO | BLOCKED |
| 5 | STANBY SIDE, NORMAL | YES | 3 |
| 4 | STANDBY SIDE, EXTERNAL CONNECTION PATH ABNORMAL | YES | 4 |
| 2 | STANDBY SIDE, HOST PATH ABNORMAL | NO | BLOCKED |
| 1 | STANDBY SIDE, HOST PATH AND EXTERNAL CONNECTION PATH ABNORMAL | NO | BLOCKED |

1501　　1502　　1503　　1504

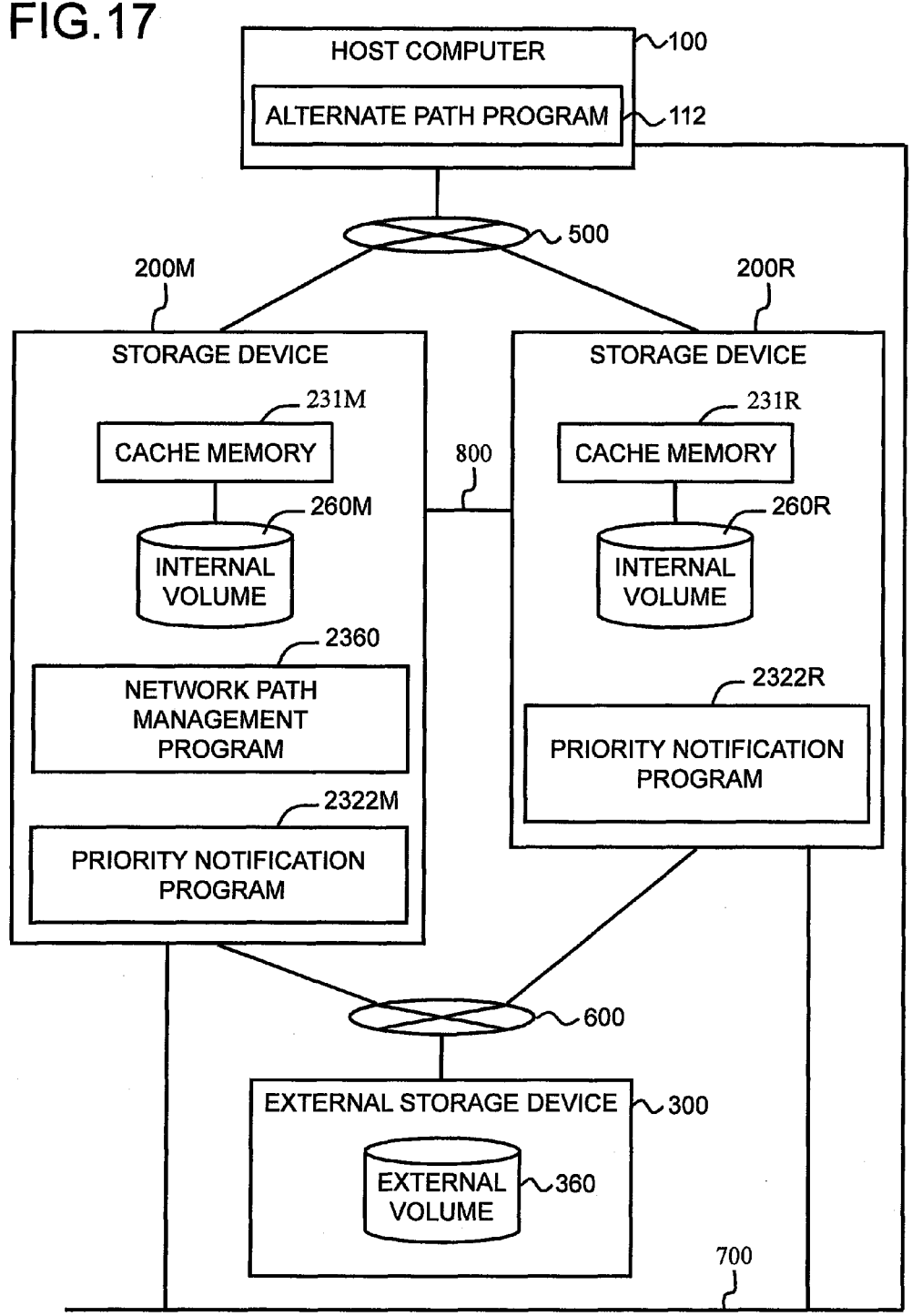

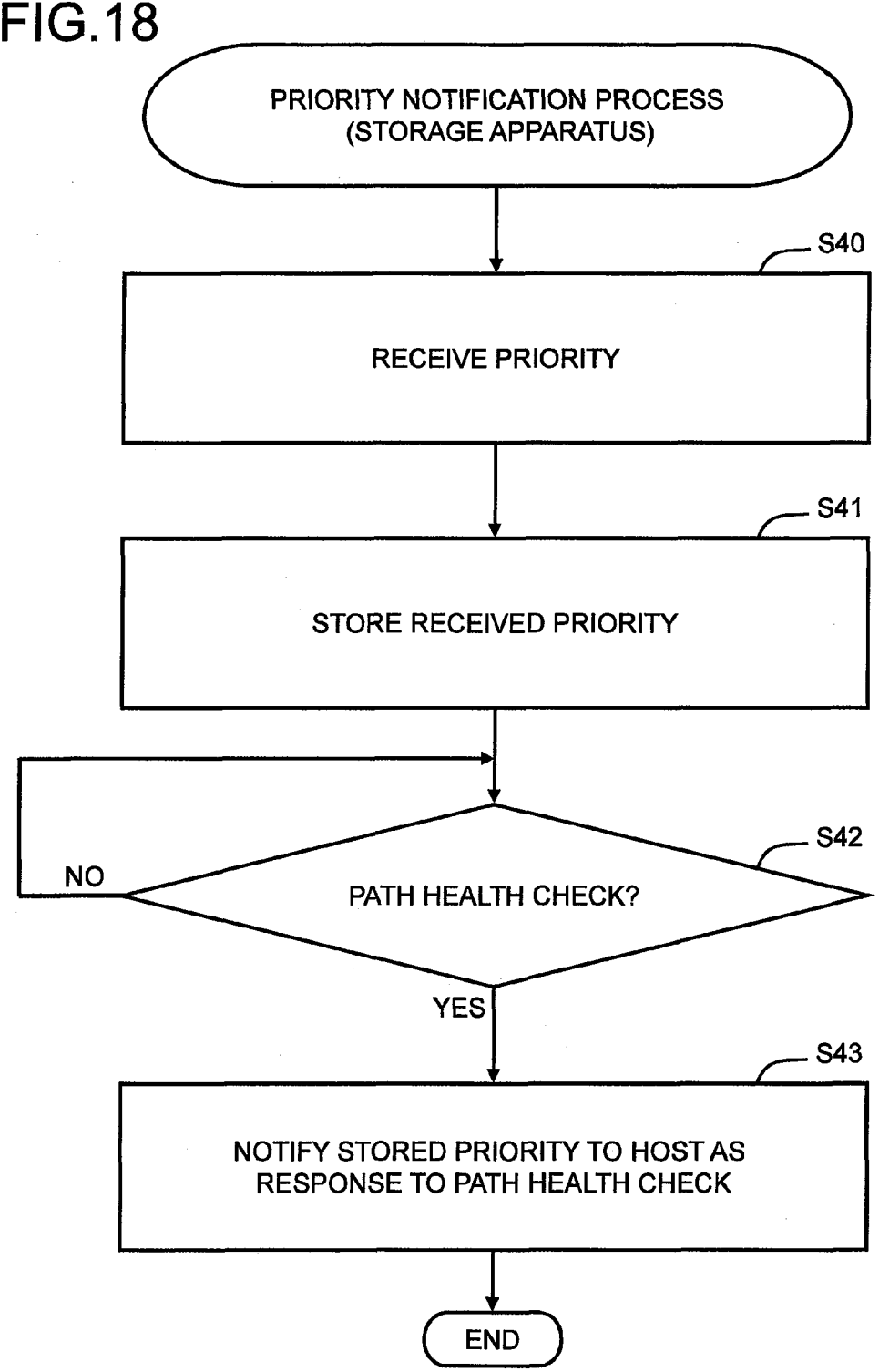

STORAGE SYSTEM AND STORAGE SYSTEM COMMUNICATION PATH MANAGEMENT METHOD

TECHNICAL FIELD

The present invention relates to a storage system and a storage system communication path management method.

BACKGROUND ART

To improve storage system availability, a copy pair is formed between a plurality of storage devices for a volume that is used by a business program running on a host computer (hereinafter, host). A target storage device allows alternate path software on the host to recognize a communication path (also called a host path hereinbelow) for accessing a target volume as the host path for accessing a source volume. The alternate path software controls which host path, of a plurality of host paths capable of being used to access a volume, will be used.

In a case where all the host paths to the source volume have been blocked as a result of damage or human error on the part of an administrator, a path switching function of the alternate path software switches from the host path to the source volume to a host path to the target volume. In accordance with this, a high-availability computer system that allows a user to continue working has been proposed (Patent Literature 1).

There are also cases in which a configuration change that impacts the access performance of the source volume, such as a change in the bandwidth setting of the communication port for the source volume or a setting change to the cache capacity allocated to the source volume, is requested. In a case like this, the configuration of the target volume is also changed to coincide with the configuration change of the source volume. In accordance with this, the source volume and the target volume are provided with the same configuration. Therefore, technology that guarantees the same access performance as that when the source volume is used even in the case of a failover from the source volume to the target volume has been proposed (Patent Literature 2).

CITATION LIST

Patent Literature

[PTL (Patent Literature) 1]
Japanese Patent Application Laid-open No. 2006-11874
[PTL 2]
Japanese Patent Application Laid-open No. 2009-032014

SUMMARY OF INVENTION

Technical Problem

In the prior art, a plurality of host paths are respectively installed between the host and each storage device to enhance the redundancy of the connections between the host and the storage devices. In addition, the host alternate path software stipulates the switching order of the respective host paths on the basis of switching priority information notified from the storage device. The switching priority information is included inside volume device information sent from the storage device to the host. The volume device information is notified by way of a host path from the storage device when the host operating system (hereinafter, OS: Operating System) or a network interface driver detects the volume inside the storage device.

The switching priority information is set so as to place priority on the host path to the source volume more than the host path to the target volume in order to suppress the generation of a failover from the source storage device to the target storage device as much as possible.

In a case where the source volume is unable to be used due to a failure or human error on the part of the administrator, the alternate path software switchingly uses the plurality of host paths connected to the source volume in order. The alternate path software checks whether or not these host paths are able to be used by issuing I/O (Input/Output) commands in order from the host path having the highest priority.

In a case where the alternate path software determines that it is not possible to use any of the host paths connected to the source volume, this software switches to a different group of host paths connected to the target volume. However, since it takes time to finish checking all the host paths of the source volume, there is the possibility of an I/O timeout error occurring and stopping the business program.

Accordingly, an object of the present invention is to provide a storage system and a storage system communication path management method that makes it possible to dynamically set the respective priorities of a plurality of communication paths to coincide with the current state of the storage system. Another object of the present invention is to provide a storage system and a storage system communication path management method that makes it possible to hold the respective priorities set for the respective communication paths inside the respective storage devices, and to notify the host computer of these priorities in response to a query from the host computer. Yet other objects of the present invention should become clear from the description of the embodiment explained hereinbelow.

Solution to Problem

A storage system according to a first aspect of the present invention for solving for the above-cited problems comprises: a first storage device, which is connected to a host computer via a first communication network; a second storage device, which is connected to the host computer via the first communication network, and, in addition, is communicably connected to the first storage device; a third storage device, which is connected to the first storage device and the second storage device via a second communication network; and a management computer, which is communicably connected to the host computer, the first storage device, the second storage device and the third storage device, wherein the first storage device comprises: a first logical volume, which is provided so as to be able to be used by the host computer; a first cache memory for temporarily storing data of the first logical volume; and a plurality of first communication paths, which are provided on the first communication network for connecting the host computer and the first logical volume, the second storage device comprises: a second logical volume, which is provided so as to be able to be used by the host computer, and which forms a copy pair with the first logical volume; a second cache memory for temporarily storing data of the second logical volume; and a plurality of second communication paths, which are provided on the first communication network to connect the host computer and the second logical volume, the third storage device comprises a third logical volume, which is associated with the first logical volume and the second logical volume, has a real storage area that is commonly associated with a virtual storage area of the first logical volume and a virtual storage area of the second logical volume, and stores data written into the first logical volume and the second logical volume, and the management computer, based on a status of the first communication network and a status of the second communication network, sets a first priority for each of the first communication paths and a second priority for each of the second communication paths, and notifies an administrator who uses either the host computer or the management computer of the set first priorities and the set second priorities respectively.

In a second aspect according to the first aspect, (1) the first storage device stores write data received from the host computer in the first cache memory, and subsequently transfers and stores this write data in the second cache memory, and furthermore transfers and stores the write data that was stored in the first cache memory in the third logical volume, and with notification being issued to the second storage device to the effect that the write data has been stored in the third logical volume, synchronizes storage contents of the first cache memory and storage contents of the second cache memory, (2) the management computer, in a case where either a failure or a configuration change occurs in any of the first storage device, the second storage device or the third storage device, acquires the status of the first communication network and the status of the second communication network, and based on one communication path assessment table selected from among a plurality of communication path assessment tables showing the relationship between the respective first priorities, the respective second priorities, and assessment values, which are computed for the respective first communication paths and the respective second communication paths, sets the respective first priorities and the respective second priorities so as to prioritize the communication path currently being used from among the first communication paths and the second communication paths, and notifies the first storage device and the second storage device of the set first priorities and the set second priorities respectively, (3) the first storage device stores the respective first priorities notified from the management computer, and in a case where the host computer queries about the statuses of the respective first communication paths, notifies the host computer of the first priority related to this query, (4) the second storage device stores the respective second priorities notified from the management computer, and in a case where the host computer queries about the statuses of the respective second communication paths, notifies the host computer of the second priority related to this query, (5) the host computer, either regularly or in accordance with an instruction, queries about the first storage device regarding the statuses of the respective first communication paths, and, in addition, queries the second storage device regarding the statuses of the respective second communication paths, and based on the respective first priorities received from the first storage device and the respective second priorities received from the second storage device, selects and uses the communication path having the highest priority, and furthermore, (6) the management computer, in a case where a cache hit ratio denoting what proportion of data, which is requested by the host computer, is stored in the first cache memory, is less than a predetermined value, selects a first assessment table, which is included in the respective communication path assessment tables, and in a case where the cache hit ratio is equal to or greater than the predetermined value, selects a second assessment table, which is included in the respective communication path assessment tables, (7) the first assessment table is configured such that the priority of a first active side communication path, which is an active communication path that is currently being used from among the respective first communication paths and the respective second communication paths, and for which both the status of the first communication network and the status of the second communication network are normal, constitutes the highest priority, and furthermore such that the priority of a first passive communication path, which is a passive side communication path that is currently being used from among the respective first communication paths and the respective second communication paths, and for which both the status of the first communication network and the status of the second communication network are normal, constitutes the lowest priority, and furthermore, such that another communication path other than the first active communication path and the first passive communication path is blocked, (8) the second assessment table is configured such that the priority of a first active communication path, which is an active side communication path, and for which both the status of the first communication network and the status of the second communication network are normal, constitutes the highest priority, furthermore such that the priority of a second active communication path, which is an active side communication path, and for which the status of the first communication network is normal and an intermittent failure has occurred in the second communication network, constitutes the secondary highest priority, furthermore such that the priority of a first passive communication path, which is a passive side communication path, and for which both the status of the first communication network and the status of the second communication network are normal, constitutes the tertiary highest priority, furthermore such that the priority of a second passive communication path, which is a passive side communication path, and for which the status of the first communication network is normal and an intermittent failure has occurred in the second communication network, constitutes the lowest priority, and furthermore, such that another communication path other than the first active communication path, the second active communication path, the first passive communication path and the second passive communication path is blocked.

In a third aspect according to the first aspect, the management computer sends and stores the set respective first priorities in the first storage device, and, in addition, sends and stores the set respective second priorities in the second storage device, the first storage device, in a case where the host computer queries about the statuses of the respective first communication paths, notifies the host computer of the respective first priorities, the second storage device, in a case where the host computer queries about the statuses of the respective second communication paths, notifies the host computer of the respective second priorities, and the host computer selects a communication path to be used based on the respective first priorities notified from the first storage device and the respective second priorities notified from the second storage device.

In a fourth aspect according to the third aspect, the management computer, in a case where either a failure or a configuration change has occurred in any of the first storage device, the second storage device or the third storage device, acquires the status of the first communication network and the status of the second communication network, and based on these acquired first communication network status and second communication network status, sets the first priorities of the first communication paths respectively and the second priorities of the second communication paths respectively, and notifies the host computer of the set respective first priorities and the set respective second priorities.

In a fifth aspect according to the third aspect, the management computer, based on a communication path assessment table showing the relationship between the respective first priorities, the respective second priorities, and assessment values, which are computed for the respective first communication paths and the respective second communication paths, sets the respective first priorities and the respective second priorities so as to prioritize the communication path currently being used from among the respective first communication paths and the respective second communication paths.

In a sixth aspect according to the fifth aspect, a first assessment table and a second assessment table are included in respective communication path assessment tables, and the management computer, in a case where a cache hit ratio denoting what proportion of data, which is requested by the host computer, is stored in the first cache memory, is less than a predetermined value, selects the first assessment table included in the respective communication path assessment tables, and in a case where the cache hit ratio is equal to or greater than the predetermined value, selects the second assessment table included in the respective communication path assessment tables.

In a seventh aspect according to the sixth aspect, the first assessment table is configured such that the priority of a first active communication path, which is an active side communication path that is currently being used from among the respective first communication paths and the respective second communication paths, and for which both the status of the first communication network and the status of the second communication network are normal, constitutes the highest priority, furthermore such that the priority of a first passive communication path, which is a passive side communication path that is not currently being used from among the respective first communication paths and the respective second communication paths, and for which both the status of the first communication network and the status of the second communication network are normal, constitutes the lowest priority, and furthermore such that another communication path other than the first active communication path and the first passive communication path is blocked, and the second assessment table is configured such that the priority of a first active communication path, which is an active side communication path, and for which both the status of the first communication network and the status of the second communication network are normal, constitutes the highest priority, furthermore such that the priority of a second active communication path, which is an active side communication path, and for which the status of the first communication network is normal and an intermittent failure has occurred in the second communication network, constitutes the secondary highest priority, furthermore such that the priority of a first passive communication path, which is a passive side communication path, and for which both the status of the first communication network and the status of the second communication network are normal, constitutes the tertiary highest priority, furthermore such that the priority of a second passive communication path, which is a passive side communication path, and for which the status of the first communication network is normal and an intermittent failure has occurred in the second communication network, constitutes the lowest priority, and furthermore such that another communication path other than the first active communication path, the second active communication path, the first passive communication path and the second passive communication path is blocked.

In an eighth aspect according to the third aspect, the management computer sets the respective first priorities and the respective second priorities so as to prioritize the communication path that is currently being used from among the respective first communication paths and the respective second communication paths.

In a ninth aspect according to the third aspect, the management computer is disposed in either the first storage device or the second storage device.

In a tenth aspect according to the first aspect, the management computer sends to the host computer the set first priorities and the set second priorities respectively.

A storage system communication path management method according to an eleventh aspect is a communication path management method for a storage system having: a first storage device, which is connected to a host computer via a first communication network; a second storage device, which is connected to the host computer via the first communication network, and, in addition, is communicably connected to the first storage device; a third storage device, which is connected to the first storage device and the second storage device via a second communication network; and a management computer, which is communicably connected to the host computer, the first storage device, the second storage device and the third storage device, the first storage device having: a first logical volume, which is provided so as to be able to be used by the host computer; and a plurality of first communication paths, which are provided on the first communication network to connect the host computer and the first logical volume, the second storage device having: a second logical volume, which is provided so as to be able to be used by the host computer, and which forms a copy pair with the first logical volume; and a plurality of second communication paths, which are provided on the first communication network to connect the host computer and the second logical volume, the third storage device having a third logical volume, which is associated with the first logical volume and the second logical volume, has a real storage area that is commonly associated with a virtual storage area of the first logical volume and a virtual storage area of the second logical volume, and stores data written into the first logical volume and the second logical volume, the method comprising: based on a status of the first communication network and a status of the second communication network, setting by the management computer first priorities for the first communication paths respectively and second priorities for the second communication paths respectively; sending and storing the set respective first priorities in the first storage device; sending and storing the set respective second priorities in the second storage device; by the first storage device, in a case where the host computer queries about the statuses of the respective first communication paths, notifying the host computer of the respective first priorities;

by the second storage device, in a case where the host computer queries about the statuses of the respective second communication paths, notifying the host computer of the respective second priorities; and by the host computer, selecting a communication path to be used based on the respective first priorities notified from the first storage device and the respective second priorities notified from the second storage device.

At least a portion of the configuration of the present invention is able to be configured as a computer program. This computer program may be affixed to and distributed on a recording medium, or may be delivered via a communication network. Furthermore, other combinations besides the combinations of the above-mentioned aspects are also included within the scope of the present invention.

BRIEF DESCRIPTION OF DRAWINGS

FIG. 6 is a diagram showing a device management table.
FIG. 7 is a diagram showing a volume management table.
FIG. 8 is a diagram showing a copy pair management table.
FIG. 10 is a diagram showing an external path management table.
FIG. 13 is a continuation of the flowchart in FIG. 12.
FIG. 14 is a diagram showing a host path assessment table.
FIG. 15 is a flowchart of a table switching process executed in a storage system related to a second example.
FIG. 16 is a diagram showing a second host path assessment table.
FIG. 17 is a diagram showing the rough configuration of a storage system related to a third example.
FIG. 18 is a flowchart showing a process for notifying the host of a priority from the storage device.

DESCRIPTION OF EMBODIMENT

The embodiment of the present invention will be explained below on the basis of the drawings. The present invention, as will be explained below, sets the priority of each host path 501 through 506 of the host 100 based on the state of the storage system.

Example 1

Figure 1:
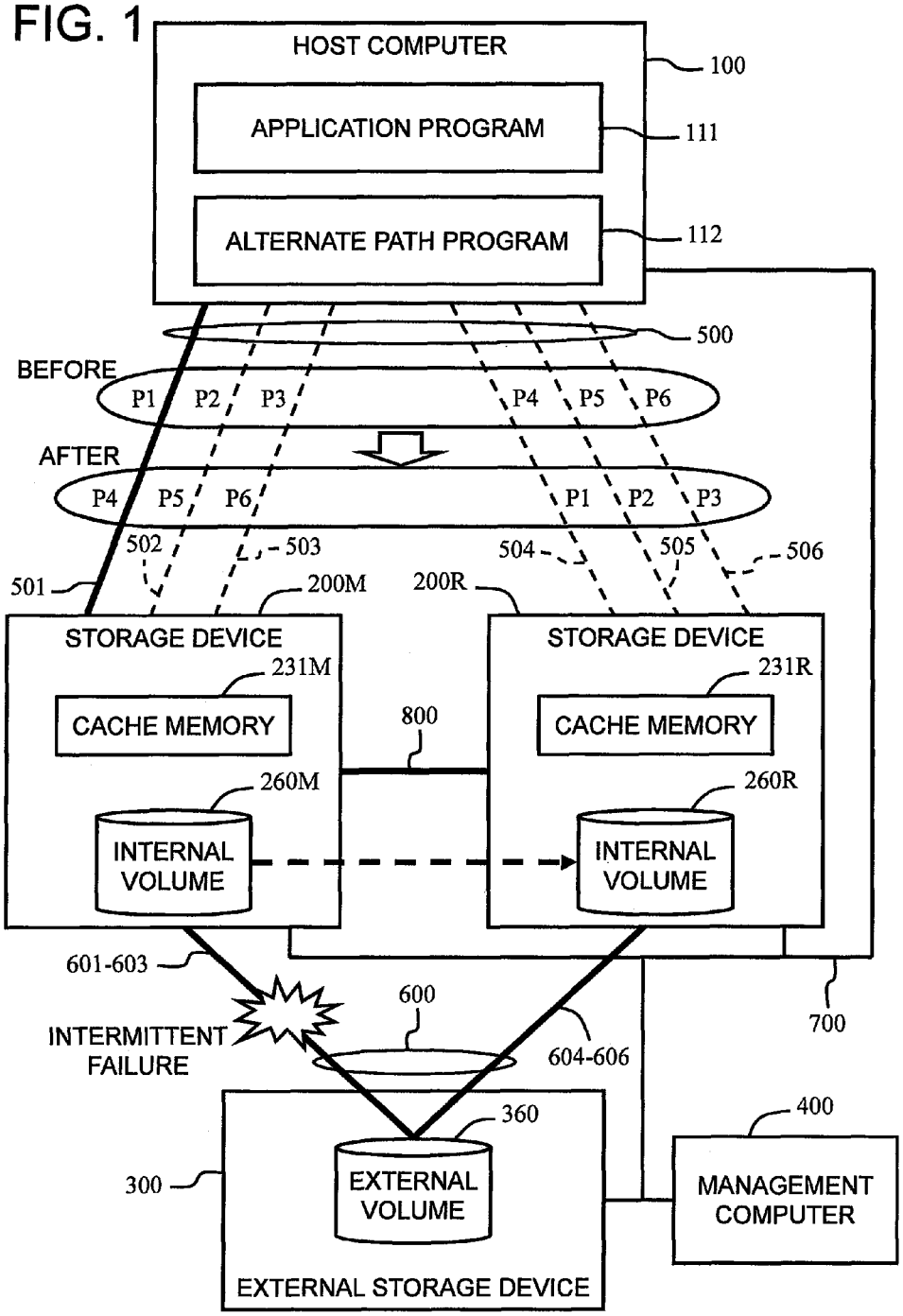
FIG. 1 is a diagram showing an overview of a storage system.
Figure 2:
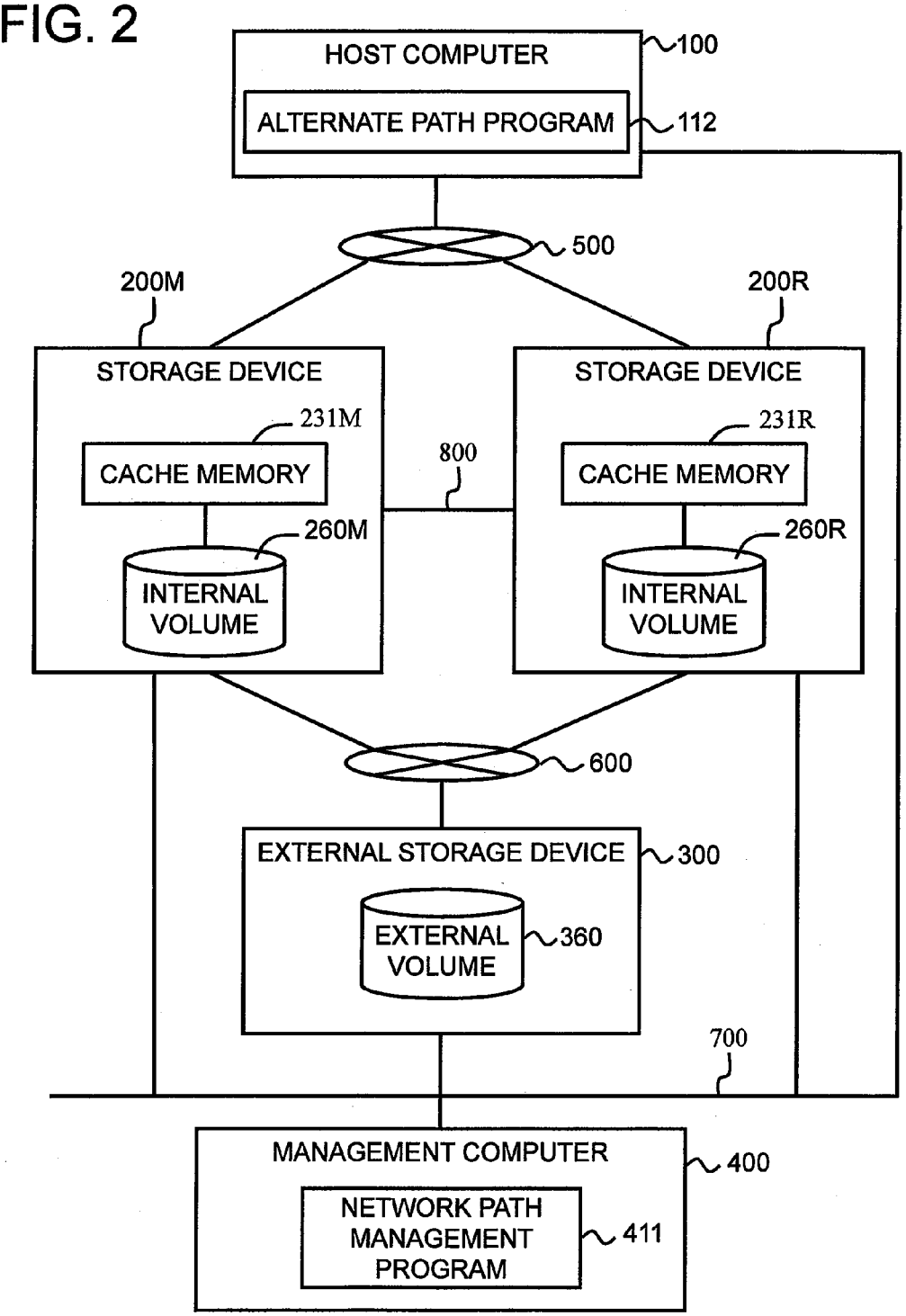
FIG. 2 is a diagram showing the overall configuration of the storage system.

FIG. 1 shows an overview of a storage system in this example. FIG. 2 shows the overall configuration of the storage system. The storage system comprises at least one host 100, at least one first storage device 200M, which is the copy source, at least one second storage device 200R, which is the copy target, at least one external storage device 300, and at least one management computer 400. The storage system may also be called a computer system.

The first storage device 200M, for example, may be installed at the main site (also called the primary site). The second storage device 200R may be installed at a remote site (also called the secondary site), which is physically separated from the main site. Or, the configuration may also be such that the first storage device 200M and the second storage device 200R are disposed inside the same site.

The host 100 is connected to the first storage device 200M and the second storage device 200R via a front-end network 500 serving as a "first communication network".

The first storage device 200M and the second storage device 200R are coupled to the external storage device 300 serving as a "third storage device" via a back-end network 600 that serves as a "second communication network". The front-end network 500 and the back-end network 600, for example, may be configured as communication networks using either the FC (Fibre Channel) protocol or the iSCSI (internet Small Computer System Interface) protocol.

The management computer 400 is respectively connected to the host 100 and the storage devices 200M, 200R, 300 via a management network 700 that serves as a "third communication network". The management network 700, for example, may be configured as a communication network using the TCP/IP (Transmission Control Protocol/Internet Protocol) protocol.

The first storage device 200M and the second storage device 200R are connected via an intercommunication channel 800. The configuration may also be such that the first storage device 200M and the second storage device 200R are connected using the back-end network 600 instead of the intercommunication channel 800.

The host 100, for example, comprises an application program 111 and an alternate path program 112. The application program 111, for example, carries out prescribed data processing in response to a request from a client terminal not shown in the drawing, and returns the result of this processing to the client terminal. The application program 111, for example, may include a customer management program, a sales management program, an e-mail management program, a video delivery program, a webpage management program or the like. The application program 111 may also be called a business application 111.

The alternate path program 112 controls which communication path, of the respective communication paths 501 through 506, is used to access a logical volume 260M (or 260R). The alternate path program 112, for example, may also be referred to as either alternate path software or an alternate path manager.

The first storage device 200M comprises a first cache memory 231M and a first logical volume 260M. The second storage device 200R comprises a second cache memory 231R and a second logical volume 260R. The configuration of the storage device will be explained in detail using FIG. 4.

The first logical volume 260M and the second logical volume 260R form a copy pair. The first logical volume 260M is the source volume, and the second logical volume 260R is the target volume. The source volume is an active volume that is used at normal times, and the target volume is a standby volume that is used at the time of a failure. Subsequent to a failover to the second logical volume due to a failure, the second logical volume becomes the active volume and the first logical volume becomes the standby volume. That is, the source volume is called the active volume, and the target volume is called the standby volume.

The first logical volume 260M and the second logical volume 260R differ from an ordinary logical volume that is created based on a real storage area, and are configured as virtual logical volumes, which are not directly based on real storage areas.

For example, the physical storage areas of a plurality of storage devices, such as hard disks (refer to the hard disk drives 270 of FIG. 4) may be collected into a single RAID group to form a redundant real storage area. A logical volume of a prescribed size may be created on top of this redundant real storage area. An ordinary logical volume is formed directly from a real storage area like this.

By contrast, the virtual logical volumes 260M, 260R are not created on the basis of the real storage areas inside the storage devices 200M, 200R in which they respectively exist. The virtual logical volumes 260M, 260R are associated with the real storage area inside the external storage device 300.

That is, the address spaces of the virtual logical volumes 260M, 260R are mapped to the address space of the real storage area of an external volume 360 inside the external storage device 300. The respective storage devices 200M, 200R incorporate the logical volume 360 in the external storage device 300 inside the storage devices 200M, 200R. The storage devices 200M, 200R provide the logical volume to the host 100 in a way that makes the logical volume 360 appear to be a logical volume residing inside the storage devices 200M, 200R.

The function for connecting the logical volume 360 that exists externally of its own device 200M, 200R to the virtual volume 260M, 260R inside its own device 200M, 200R and that incorporates this logical volume inside its own device 200M, 200R is called the external connection function in this specification.

In a case where the host 100 issues a write command to the first logical volume 260M, the first storage device 200M sends the write command and write data to the external storage device 300. The write address inside the write command is rewritten to an address specifying an area inside the logical volume 360. The external storage device 300 writes the received write data to the external volume 360.

In a case where the host 100 issues a read command to the first logical volume 260M, the first storage device 200M sends the read command to the external storage device 300. The read address inside the read command is rewritten to an address specifying an area inside the logical volume 360. The external storage device 300 reads out the data from the external volume 360 and sends this data to the first storage device 200M.

The above describes the basic operation without explaining the role of the cache memory 231M. The role of the cache memory 231M in this operation will be explained further below.

The external storage device 300 exists externally of the first storage device 200M and the second storage device 200R, and as such, is called the external storage device in this example.

The real volume 360 of the external storage device 300 will be called the external volume in this example. The real volume is a logical volume created from the real storage area inside the storage device in which this volume is disposed. As described above, the external volume 360 is coupled to the virtual logical volumes 260M, 260R. Accordingly, in this example, the virtual logical volumes 260M, 260R connected to the external volume 360 may be called the external volumes 260M, 260R.

A plurality of communication paths 601 through 603 for connecting the first logical volume 260M and the external volume 360, and a plurality of communication paths 604 through 606 for connecting the second logical volume 260R and the external volume 360 are disposed on the back-end network 600.

The respective communication paths 601 through 606 may also be called either external connection paths or external communication paths. For example, the external communication paths 601 through 603 linked to the first logical volume 260M may be called either the first external connection paths or the first external communication paths. The external communication paths 603 through 606 linked to the second logical volume 260R may be called either the second external connection paths or the second external communication paths.

In this example, the first communication paths 501 through 503 and the first external communication paths 601 through 603 correspond to one another on a one-to-one basis, and the second communication paths 504 through 506 and the second external communication paths 604 through 606 correspond to one another on a one-to-one basis.

The management computer 400, as shown in FIG. 2, comprises a network path management program 411 for managing a communication path (may also be called a network path). The network path management program 411 monitors the statuses of the respective storage devices 200M, 200R, 300, and, as will be described further below, determines the priority of a communication path, notifies the determined priority to the host 100 and sets this priority.

A plurality of host paths 501 through 506 are set on the front-end network 500. The one side of the host paths 501 through 503 corresponds to the "first communication path" and connects the host 100 to the source volume 260M. The host paths 501 through 503 of the one side are active paths that are used at normal times.

The other side of the host paths 504 through 506 corresponds to the "second communication path" and connects the host 200 to the target volume 260R. The host paths 504 through 506 of the other side are passive paths used in a case where a failure has occurred in the first storage device 200M. The term passive may also be changed to standby. That is, a passive path may also be called a standby path.

A priority P1 through P6 is set for each host path 501 through 506. For example, prior to a setting change, the highest priority P1 is set for the first active path 501, the next highest priority P2 (P1>P2) is set for the second active path 502, and the next highest priority P3 (P2>P3) is set for the third active path 503.

The next highest priority P4 (P3>P4) is set for the first passive path 504, the next highest priority P5 (P4>P5) is set for the second passive path 504, and the lowest priority P6 (P1>P2>P3>P4>P5>P6) is set for the third passive path 504.

As will be explained below, at a predetermined time, the management computer 400 assesses the priorities of the respective communication paths 501 through 506, and notifies new priorities to the host 100 via the respective storage devices 200M, 200R.

Consequently, in the example shown in FIG. 1, the priorities of the first communication path 501 through 503 linked to the first logical volume 260M are lowered (lowered from P1 through P3 to P4 through P6), and the priorities of the second communication path 504 through 506 linked to the second logical volume 260R are raised (raised from P4 through P6 to P1 through P3).

The change of priorities shown in FIG. 1 denotes an extreme case. As will be explained below, the management computer 400 assesses the priorities of the respective communication paths 501 through 503 and 504 through 506 so as to prevent a failover from the first logical volume 260M to the second logical volume 260R as much as possible.

The storage devices 200M, 200R comprises a synchronous copy function. The synchronous copy function is a function for transferring data written to the copy source to the copy target in synch with this write, and making the storage contents of the copy target the same as the storage contents of the copy source.

The synchronous copy function makes the source volume 260M and the target volume 260R into a copy pair. Write data written to the source volume 260M is transferred to the target volume 260R.

The write data from the host 100 to the source volume 260M is temporarily held in the cache memory 231M inside the first storage device 200M, which is the copy source. In this specification, the data temporarily held in the cache memory is called dirty data. Dirty data signifies data that is only stored in the cache memory. Because dirty data is only stored in the cache memory, it is not possible to erase this data from the cache memory.

The data on the cache memory is written to the hard disk drives (refer to FIG. 4) corresponding to the logical volume. Data which has been written to both the cache memory and the hard disk drives 270 is called clean data. Because clean data has been written to both the cache memory and the hard disk drive, it is not a problem when this data is erased from the cache memory. Accordingly, the area on the cache memory in which clean data is written is freed up. This freeing process is called a cache destage. Other data is temporarily stored in the area that has been freed.

The write data written to the source cache memory 231M is sent to the storage device 200R, which is the copy target, in accordance with the synchronous copy function of the first storage device 200M. The target storage device 200R writes the received write data to the cache memory 231R, and notifies the source storage device 200M to the effect that the write is complete.

The source storage device 200M, upon receiving the write-complete notification from the target storage device 200R, notifies the host 100 that issued the write command to the effect that the processing of this write command has been completed.

In accordance with the above-described process, the dirty data stored in the source cache memory 231M matches the dirty data stored in the target cache memory 231R.

The dirty data inside the source cache memory 231M is written to the logical volume 260M inside the source storage device 200M asynchronously to the sending of the write-complete notification to the host 100.

As described above, the logical volume 260M of the storage device 200M exists virtually, and the real storage area for storing this data is inside the external volume 360 of the external storage device 300. Therefore, the data write to the logical volume 260M actually signifies the writing of the data to the external volume 360 connected to the logical volume 260M.

When the dirty data on the cache memory 231M is written to the logical volume 260M, the status of this written data changes from dirty to clean. Accordingly, the source storage device 200M carries out a cache destage process. That is, the source storage device 200M frees the storage area on the cache memory 231M in which the data that was written to the external volume 360 is being stored.

The source storage device 200M, after completing the cache destage process, sends the cache destage information to the target storage device 200R. The synchronous copy function is used to send the cache destage information. The cache destage information shows which area on the cache memory 231M has been freed.

The target storage device 200R, based on the received cache destage information, frees a predetermined area inside the target cache memory 231R. In accordance with this, the cache destage status of the cache memory 231M related to the source volume 260M is synchronized with the cache destage status of the cache memory 231R related to the target volume 260R.

The cache destage status is constantly synchronized between the source storage device 200M and the target storage device 200R like this. Therefore, even in a case where it becomes impossible to use the source volume 260M of the source storage device 200M due to a failure, it is possible for business processing to continue in accordance with switching to the target volume 260R.

The storage devices 200M, 200R comprise a function for notifying network interface 160 of the host 100 about device information for the logical volumes 260M, 260R (refer to FIG. 3) via the front-end network 500.

The device information comprises a volume identifier for uniquely specifying a volume 260M, 260R inside the system. The storage devices 200M, 200R comprise a function for matching the volume identifier of the target volume to the volume identifier of the source volume. Furthermore, in a case where there is a failover to the target volume, and the configuration transitions to a failback configuration in which the copy status is the opposite of normal (that is, the target volume becomes the source), the once-configured volume identifier does not change.

Figure 3:
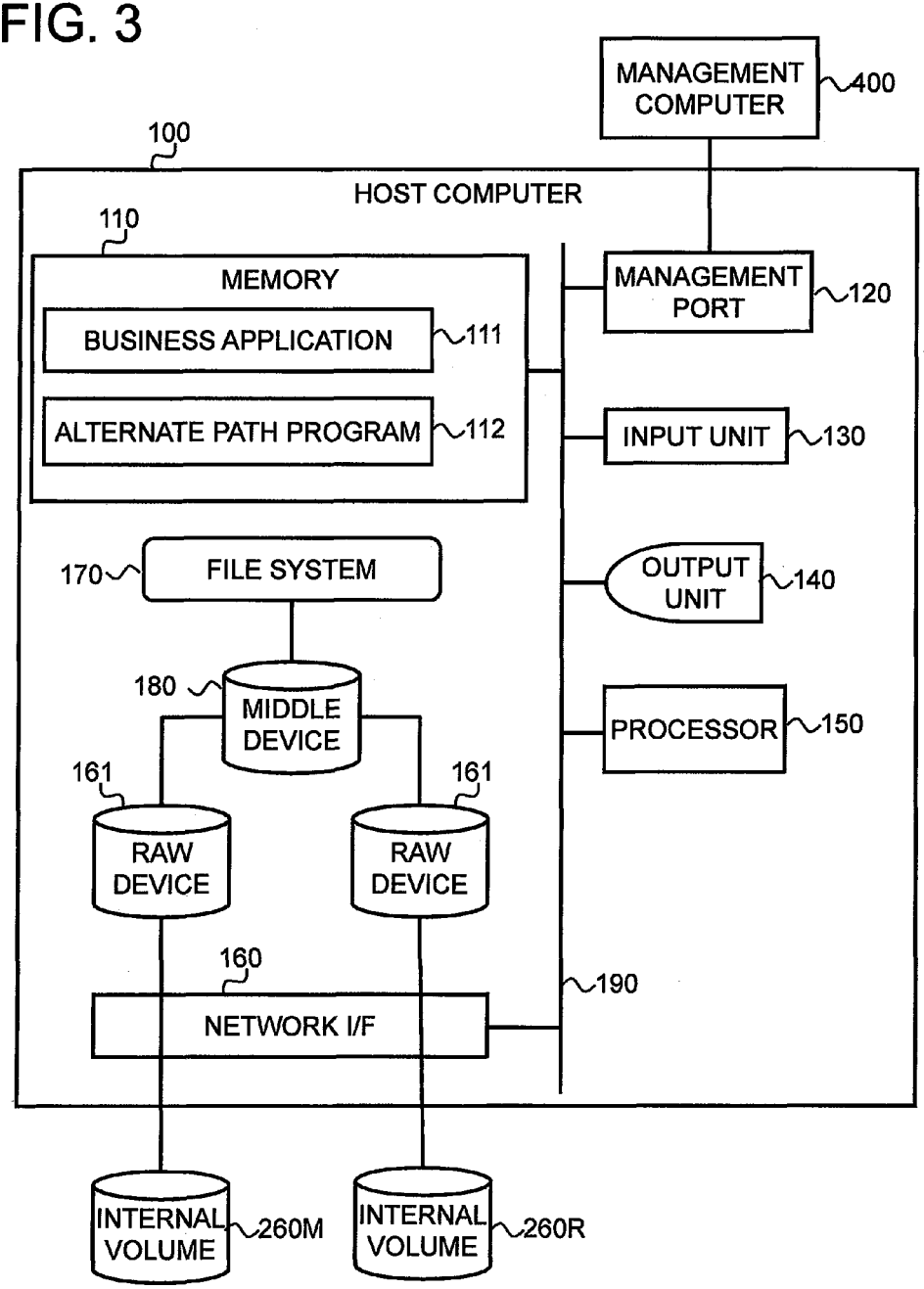
FIG. 3 is a block diagram of a host.

FIG. 3 is a block diagram of the host 100. The host 100, for example, comprises a memory 110, a management port 120, an input unit 130, an output unit 140, a processor 150, a network interface 160, a RAW device 161, a file system 170, a middle device 180, and an internal bus 190.

The memory 110 stores the business application 111, the alternate path program 112, the file system 170, and other control programs. The memory 110 also provides a work area to the processor 150.

The management port 120 is the communication port for connecting the host 100 to the management network 700. A unique network address, such as a WWN (World Wide Name) or an IP (Internet Protocol) address, for example, is given to the management port 120.

The input unit 130, for example, is configured from either any one of a keyboard switch, a tablet, a mouse, a touch panel, or a voice input unit, or a combination thereof. The user utilizes the input unit 130 to issue an instruction to the host 100. The output unit 140, for example, is configured as either any one of a monitor display, a speaker, or a printer, or a combination thereof. The output unit 140, under the control of the processor 150, provides the user with a GUI (Graphical User Interface) and various information.

The processor 150 controls the operation of the host 100. The processor 150 executes the business application 111 and the alternate path program 112 stored in the memory 110, and various control processes based on the file system 170.

The network interface 160 is a communication interface for the host 100 to communicate with the storage devices 200M, 200R via the front-end network 500.

The network interface 160, upon detecting a logical volume 260M, 260R of the storage systems 200M, 200R, creates a RAW device 161 based on the device information notified from the storage devices 200M, 200R by way of the front-end network 500.

One RAW device 161 is provided for each communication path (host path) connecting the network interface 160 to the logical volumes 260M, 260R. FIG. 3 shows two RAW devices 161. In a case where six communication paths 501 through 506 are connected to the network interface 160 as shown in FIG. 1, one RAW device 161 is provided for each of the communication paths 501 through 506.

The alternate path program 112 comprises a function for collecting a plurality of RAW devices 161 having a common volume identifier into a single middle device 180. The host 1000S (not shown in the drawing) creates one file system 170 based on one middle device 180.

The business application 111 issues an I/O to the middle device 180 via the file system 170. The alternate path program 112, upon detecting an I/O that has been issued to the middle device 180, selects one RAW device from among the plurality of RAW devices 161 associated with the middle device 180. The alternate path program 112 issues an I/O to the selected RAW device 161. The I/O issued to the selected RAW device 161 is transmitted to either the logical volume 260M or the logical volume 260R via the host path corresponding to this RAW device 161. The method by which the alternate path program 112 selects the RAW device 161 will be explained further below.

As described above, in this example, the volume identifier of the target volume 260R is set so as to be the same as the volume identifier of the source volume 260M. Therefore, the alternate path program 112 recognizes the host path linked to the target volume 260R as the host path linked to the source volume 260M.

Figure 4:
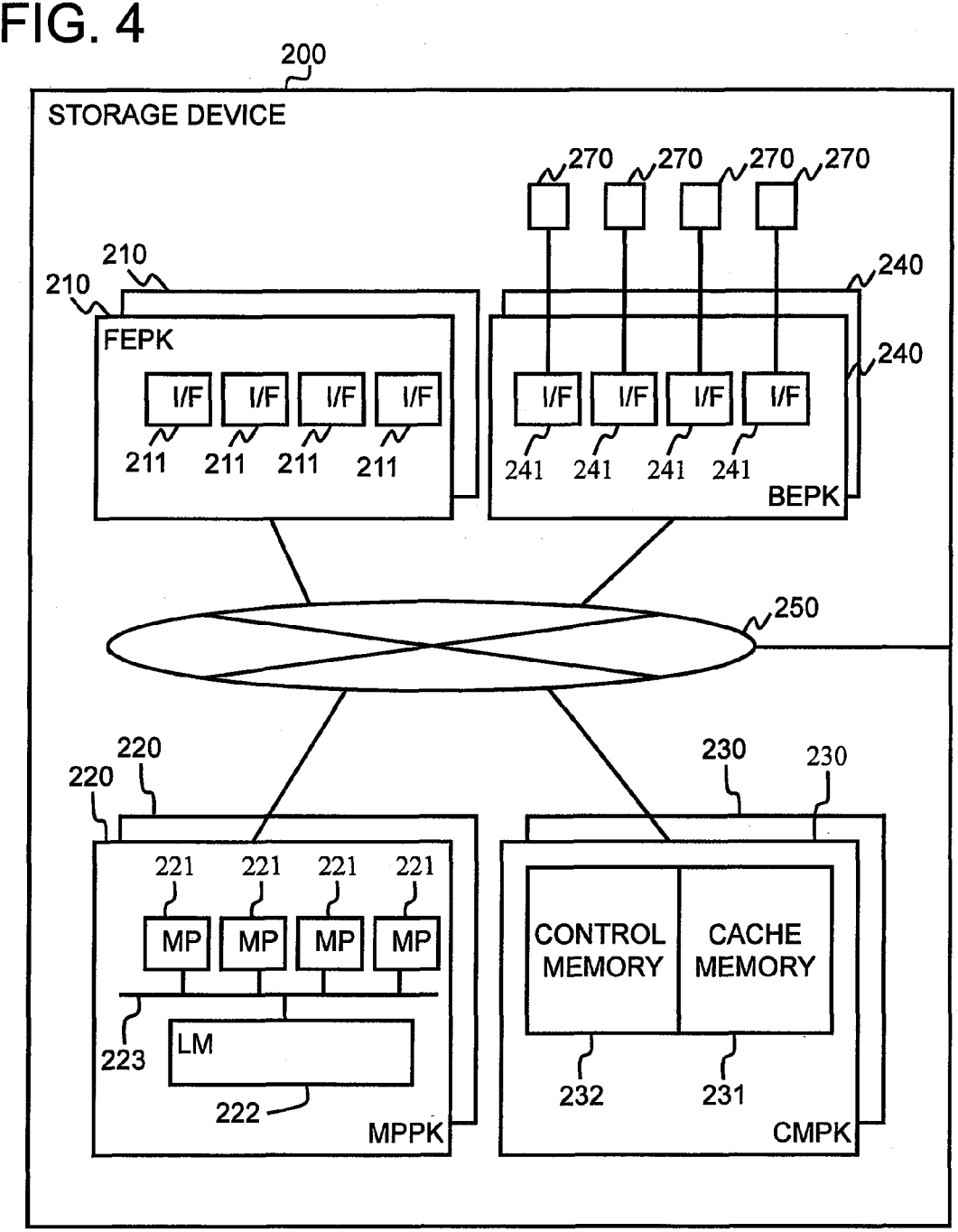
FIG. 4 is a block diagram of a storage device.

FIG. 4 is a block diagram of a storage device. The respective storage devices 200M, 200R may comprise the same configuration. Accordingly, the configuration of a storage device 200 that is representative of the respective storage devices 200M, 200R will be explained.

The storage device 200, for example, comprises a FEPK (Front-End PacKage) 210, a MPPK (Microprocessor PacKage) 220, a CMPK (Cache Memory PacKage) 230, a BEPK (Back-End PacKage) 240, an internal network 250, and hard disk drives 270.

The MPPK 220 is communicably connected to the FEPK 210, the CMPK 230, and the BEPK 240 by way of the internal network 250.

The FEPK 210 is a control circuit for communicating with the host 100. The FEPK 210 comprises a plurality of host interfaces 211. The FEPK 210 is connected to the host 100 network interface 160 via the front-end network 500. The FEPK 210 is also connected to the partner storage device in a copy pair by way of the intercommunication channel 800 (or the back-end network 600). In addition, the FEPK 210 is also connected to the external storage device 300 via the back-end network 600.

The MPPK 220 controls the operation of the storage device 200. The MPPK 220 comprises a plurality of MP (Microprocessors) 221, a local memory (LM) 222, and a bus 223 that interconnects these components. The LM 222 stores a portion of the control information stored in a control memory 232.

The CMPK 230 provides the storage device 200 with a shared memory area. The CMPK 230 comprises a cache memory 231 and the control memory 232. The cache memory 231 and the control memory 232 may be configured from either a volatile memory or a nonvolatile memory. In a case where a volatile memory is used, it is preferable to use a configuration in which the memories are backed up by either an internal battery or an external battery.

The cache memory 231 either temporarily stores data written to the hard disk drives 270, or temporarily stores data read out from the hard disk drives 270.

The control memory 232 stores control information and management information required for respective processes. The information stored in the control memory 232, for example, may include hard disk drive configuration information and logical volume configuration information.

The BEPK 240 is a control circuit for communicating with the respective hard disk drives 270, and comprises a plurality of disk interfaces 241. Each disk interface 241, for example, is connected to each hard disk drive 270 via a communication cable. The BEPK 240 processes the exchange of data between the cache memory 231 and the respective hard disk drives 270.

Each hard disk drive 270 is an example of a device for storing data. The present invention is not limited to a hard disk drive, and, for example, may utilize various devices that are capable of reading and writing data, such as a semiconductor memory device, an optical disk device, a magneto-optical disk device, a magnetic tape device, and a flexible disk device. In a case where a hard disk drive is used, for example, it is possible to use a FC (Fibre Channel) disk, a SCSI (Small Computer System Interface) disk, a SATA disk, an ATA (AT Attachment) disk, and an SAS (Serial Attached SCSI) disk.

In a case where a semiconductor memory device is used, for example, it is possible to use a variety of memory devices, such as a flash memory, a FeRAM (Ferroelectric Random Access Memory), a MRAM (Magnetoresistive Random Access Memory), and an Ovonic Unified Memory, a RRAM (Resistance RAM), and a PRAM (Phase-change RAM).

The external storage device 300 is also able to be configured the same as the configuration shown in FIG. 4. Furthermore, the first storage device 200M and the second storage device 200R do not have to comprise hard disk drives 270. This is because each storage device 200M, 200R is able to incorporate the external volume 360 inside its own device using the external connection function. Therefore, the storage devices 200M, 200R are not necessarily required to comprise hard disk drives 270 and a BEPK 240.

Figure 5:
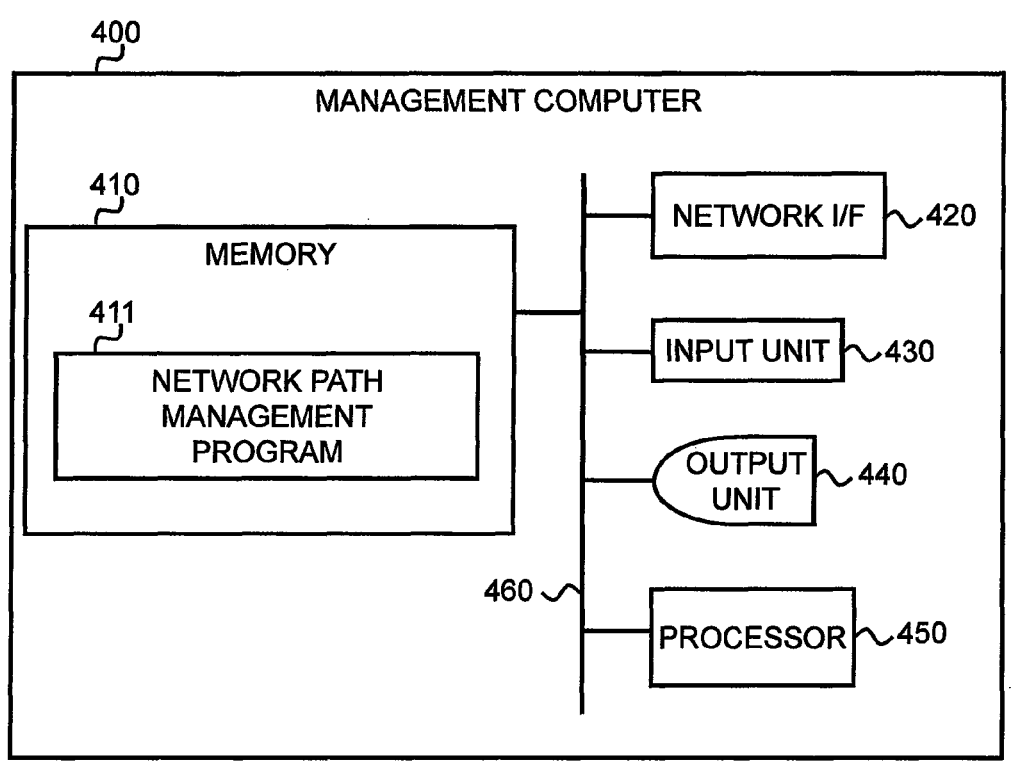
FIG. 5 is a block diagram of a management computer.

FIG. 5 is a block diagram of the management computer 400. The management computer 400, for example, comprises a memory 410, a network interface 420, an input unit 430, an output unit 440, a processor 450, and an internal bus 460.

The memory 410 stores a network path management program 411, and respective tables 1000, 1100, 1200, 1300, 1400 and 1500, which will be explained further below. The processor 450 realizes a communication path management function, which will be explained further below, by reading in and executing the program 411 stored in the memory 410.

The network interface 420 is a communication interface for connecting to the management network 700. The input unit 430 and the output unit 440 are the same as the input unit 130 and the output unit 140 of the host 100, and as such, explanations thereof will be omitted.

A device management table 1000, a volume management table 1100, a copy pair management table 1200, a host path management table 1300, and an external path management table 1400, which are utilized by the network path management program 411, will be explained. These tables 1000 through 1400 are created based on information regularly collected from the host 100 and the respective storage devices 200M, 200R, 300. The configuration may also be such that the management computer 400 collects the information required for the tables 1000 through 1400 from inside the storage system in response to an instruction from the administrator. In the following explanation, identifier will be abbreviated as ID.

FIG. 6 shows a table 1000 for managing a device. The device management table 1000 manages the respective devices inside the storage system (the host and storage devices). The device management table 1000, for example, comprises a device ID column 1001, a type column 1002, and a management port address column 1003.

The device ID column 1001 stores an ID for uniquely identifying the host 100 and the respective storage devices 200M, 200R, 300 inside the storage system. The type column 1002 stores the type of each device. The management port address column 1003 stores the address (the IP address or WWN) of the management port provided in each device.

For example, in a case where the device is connected to the management network 700, the network path management program 411 acquires information from the device connected thereto, and stores this information in the device management table 1000. The network path management program 411, in response to an instruction from the administrator, also acquires information from a specified device, and stores the acquired information in the device management table 1000.

FIG. 7 shows a table for managing a plurality of logical volumes. The volume management table 1100, for example, comprises a volume ID column 1101, a device type column 1102, a capacity column 1103, and a source device ID column 1104.

The volume ID column 1101 stores a volume ID for uniquely specifying each logical volume inside the system. The device type column 1102 stores information for distinguishing whether the logical volume is a volume (an internal volume) inside the storage device 200M, 200R, or an external volume connected to the external volume inside the external storage device 300.

The capacity column 1103 stores the maximum storage size of each logical volume. The source device ID column 1104 stores an ID for specifying the real storage area on which the logical volume is created.

The logical volume inside the first storage device 200M, which is specified as "ST1.VOL001", uses the external volume specified as "ST3.VOL033", and has a storage size of "10 GB".

Another logical volume inside the first storage device 200M, which is specified as "ST1.VOL002", is disposed on the real storage area specified as "ST1.PG001", and has a storage size of "5 GB". PG is the abbreviation for parity group.

FIG. 8 shows table 1200 for managing a copy pair. The copy pair management table 1200, for example, comprises a pair ID column 1201, a copy type column 1202, a pair status column 1203, an active volume ID column 1204, and a standby volume ID column 1205.

The pair ID column 1201 stores an ID for uniquely specifying each copy pair inside the system. The copy type column 1202 stores information for distinguishing whether the copy pair type is "cluster", or either "true copy" or "shadow image".

"Cluster" denotes a copy, which changes the volume ID of the target volume to the volume ID of the source volume without making the host 100 aware of which volume is being used. "True copy" signifies the copying of data between a source volume and a target volume, which are disposed in respectively different storage devices. "Shadow image" signifies the copying of data between a source volume and a target volume, which are disposed inside the same storage device.

The pair status column 1203 manages the status of each copy pair. The status of a copy pair, for example, may include "pair", "suspend", "split", and "resync". "Pair" signifies that a source volume and a target volume form a pair, and the storage contents of the two volumes are in synchronization. "Suspend" signifies that a copy process has been cancelled. "Split" signifies that a copy pair has been disengaged. "Resync" signifies a reverse copy (that is, a state in which the data of the copy target is copied to the copy source).

The active volume ID column 1204 stores a volume ID for specifying an active volume (a source volume) for processing an I/O command issued from the host 100. The standby volume ID column 1205 stores a volume ID for specifying a standby volume (a target volume).

Figure 9:
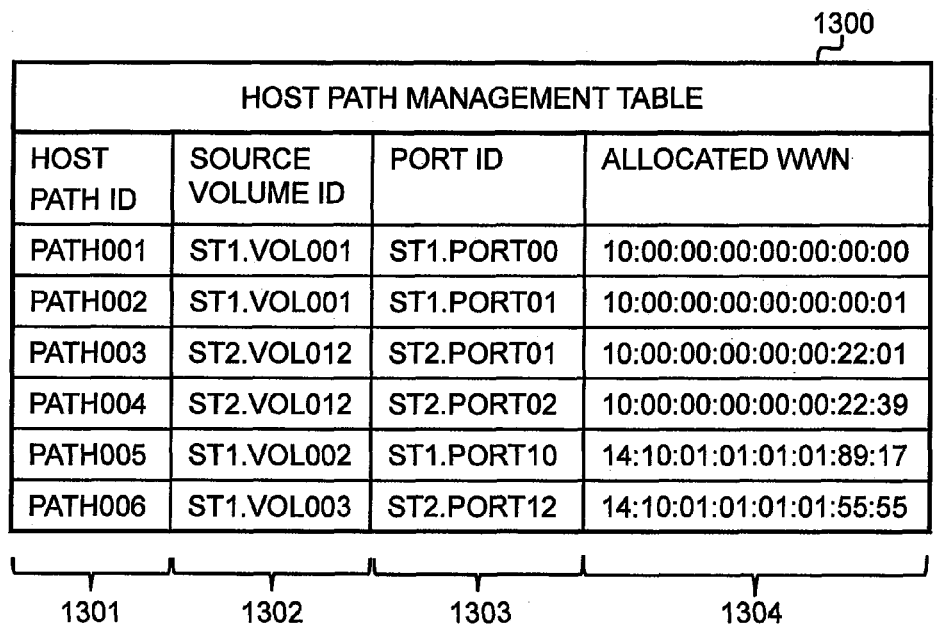
FIG. 9 is a diagram showing a host path management table.

FIG. 9 shows a table 1300 for managing a plurality of host paths. The host path management table 1300, for example, comprises a host path ID column 1301, a source volume ID column 1302, a port ID column 1303, and an allocated WWN column 1304.

The host path ID column 1301 stores an ID for uniquely specifying each host path inside the system. The source volume ID column 1302 stores the ID of a volume linked to the host path. The port ID column 1303 stores information for identifying the communication port of the storage device linked to the host path. The allocated WWN column 1304 stores the WWN allocated to the communication port.

FIG. 10 shows a table 1400 for managing the respective external paths. The external path management table 1400, for example, comprises an external volume ID column 1401, an external port ID column 1402, a target port ID column 1403, and a source volume ID column 1404.

The external volume ID column 1401 stores an ID for specifying the logical volume 260M, 260R that is connected to the external volume 360. The external port ID column 1402 stores an ID for specifying the communication port that the external connection volumes 260M, 260R are using for external connection.

The target port ID column 1403 stores an ID for specifying the communication port that is allocated to the external volume 360. The source volume ID column 1404 stores an ID for specifying the external volume 360 that is providing the real storage area to the external connection volume.

The logical volume 260M inside the first storage device 200M, which is specified as "ST1.VOL001", is connected to the external storage device 300 target port, which is specified as "ST3.PORT02", by way of the first storage device 200M communication port, which is specified as "ST1.PORT11". The external volume 360, which is specified as "ST3.VOL033", is connected to this target port.

Similarly, the logical volume 260R inside the second storage device 200R, which is specified as "ST2.VOL002", is connected to the external storage device 300 target port, which is specified as "ST3.PORT03" by way of the second storage device 200R communication port, which is specified as "ST2.PORT22". The external volume 360, which is specified as "ST3.VOL033", is connected to this target port.

For the sake of convenience, FIG. 10 shows a case in which one external communication path (external connection path) is set for each external volume, but a plurality of external communication paths may also be set for each external volume.

Furthermore, it is also possible to associate the host path (higher level-side path) shown in FIG. 9 with the external communication path (lower level-side path) shown in FIG. 10. For example, by providing in the management table 1400 shown in FIG. 10 a host path ID column that is the same as the host path ID column 1301, it is possible to associate the host path with the external communication path on a one-to-one basis.

Figure 11:
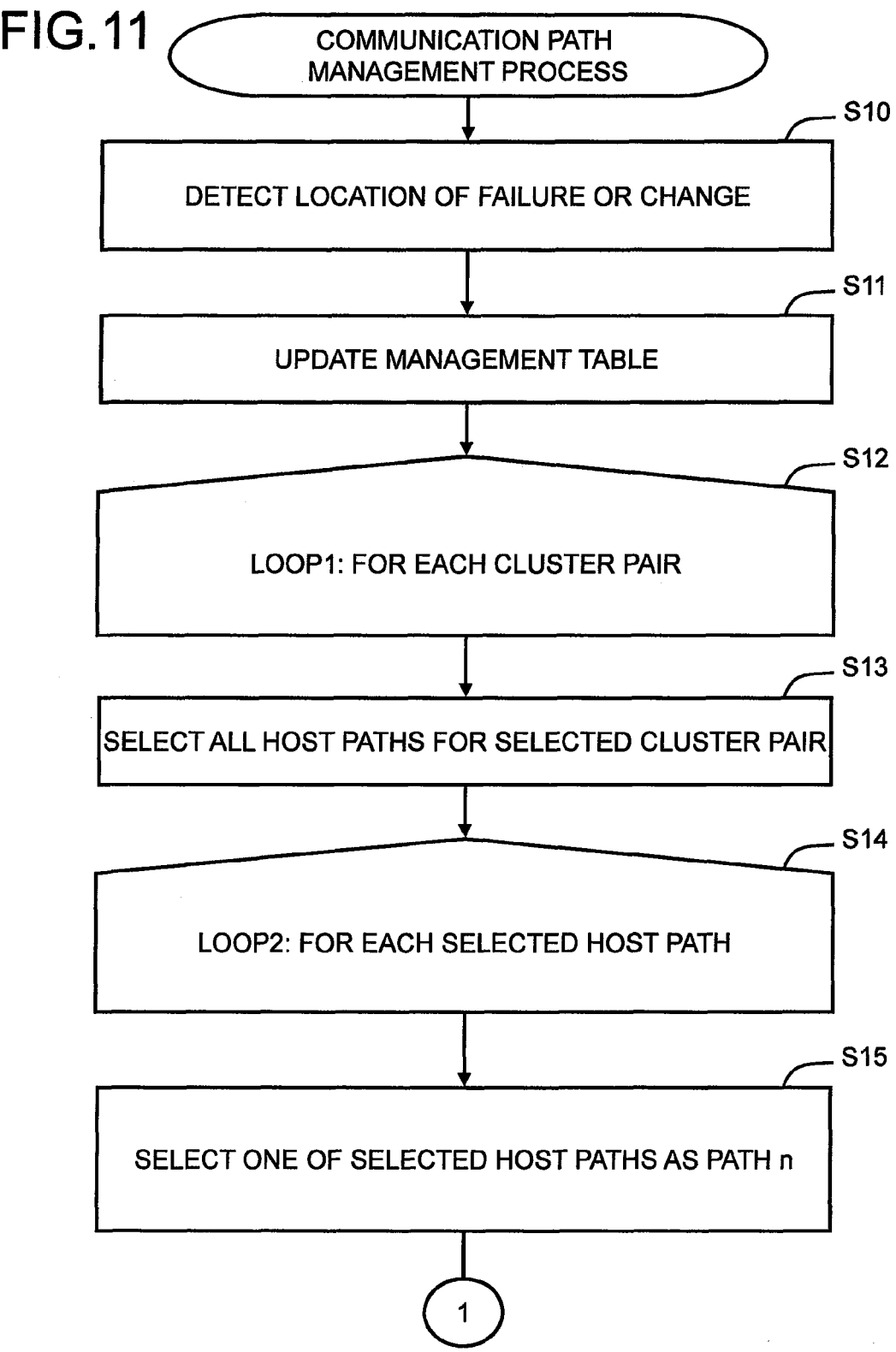
FIG. 11 is a flowchart of a communication path management process.

The network path management process will be explained by using FIGS. 11 through 13. This process is executed by the network path management program 411. Hereinbelow, the entity performing the operation will be explained as the management computer 400, which executes the network path management program 411.

The management computer 400, based on information notified from the respective storage devices 200M, 200R, 300, detects whether or not a failure or a configuration change has occurred in the storage devices 200M, 200R, 300 (S10). In a case where a failure or a configuration change is detected, this process commences. This process may also be started in accordance with an instruction from the administrator.

The management computer 400 detects either the location of the failure or the location of the configuration change based on either the failure information or the configuration change information notified from either the storage devices 200M, 200R or the external storage device 300 (S10).

The management computer 400, based on either the failure information or the configuration change information, respectively updates information in the locations that require updating in the volume management table 1100, the copy pair management table 1200, the host path management table 1300, and the external path management table 1400 (S11).

The method of updating the management tables will be explained. The management computer 400 requests the respective storage devices 200M, 200R, 300, which are registered in the device management table 1000, to send configuration information. This request is sent to the management port addresses 1003 stored in the device management table 1000.

The management computer 400 references the copy type 1202 of the copy pair management table 1200, selects the pair IDs in which "cluster" is set, and executes the following steps for each selected pair ID (S12).

The management computer 400 selects one pair ID from among the pair IDs selected in S12, and selects all the host paths that are related to this pair ID (S13). Specifically, the management computer 400 references the copy pair management table 1200, and selects both a volume ID that is registered as an active volume and a volume ID that is registered as a standby volume. The management computer 400 references the host path management table 1300, and selects all the host path IDs associated with the source volume ID that is equivalent to the selected volume ID.

The management computer 400 executes the following steps for each host path selected in S13 (S14). The management computer 400 selects as the PATH n any one host path from among the selected host paths (S15).

Figure 12:
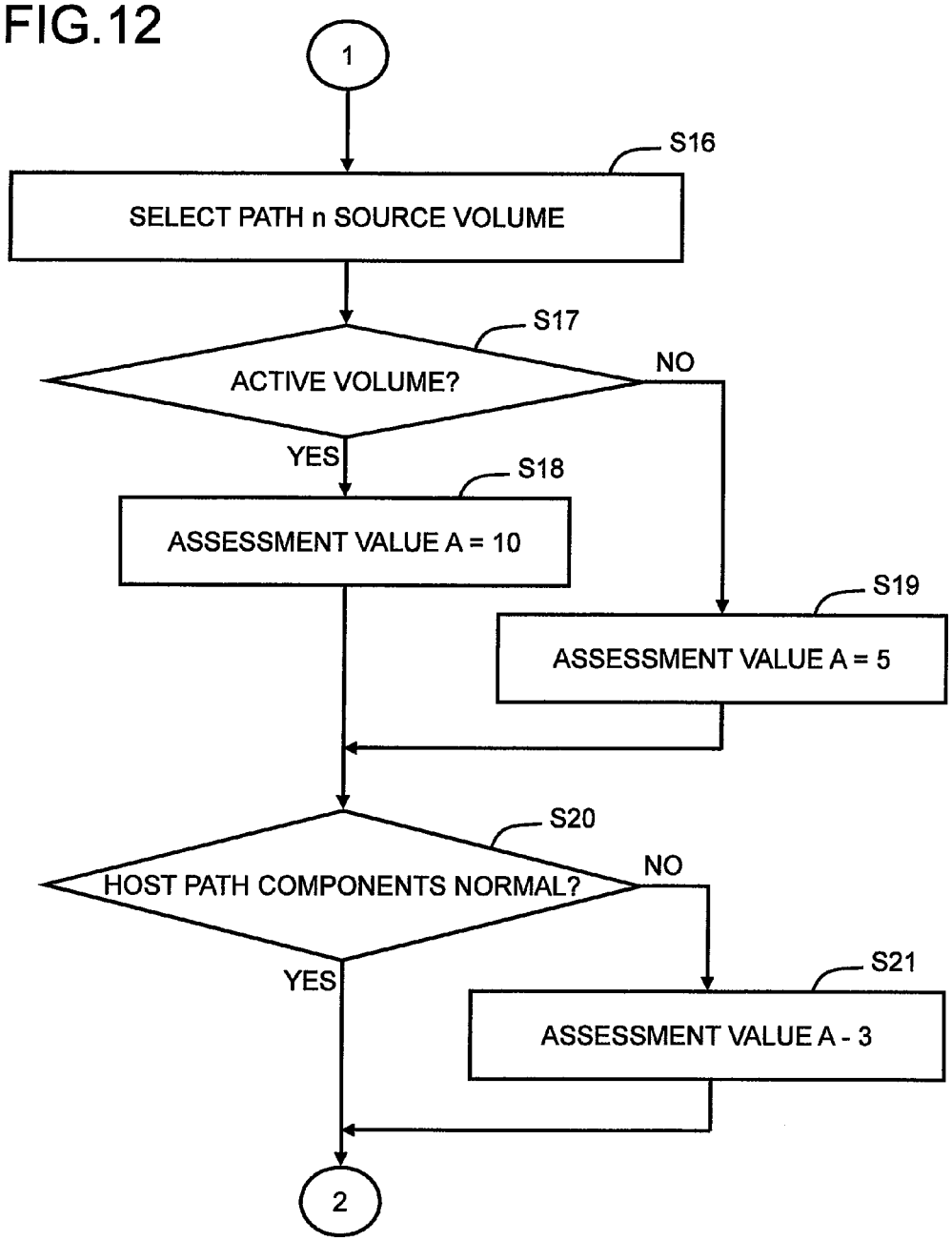
FIG. 12 is a continuation of the flowchart in FIG. 11.

Proceed to FIG. 12. The management computer 400 references the host path management table 1300 and selects the source volume ID corresponding to the PATH n (S16). The management computer 400 references the copy pair management table 1200, and collates the source volume ID selected in S16 against the active volume ID and the standby volume ID. In accordance with this, the management computer 400 determines whether or not the source volume ID selected in S16 is the active volume of the cluster pair (S17).

In a case where the source volume is the active volume (S17: YES), the management computer 400 sets the assessment value A of the host path PATH n to 10 (S18). In a case where the source volume is not the active volume (that is, a case in which the source volume is the standby volume), the management computer 400 sets the assessment value A of the host path PATH n to 5 (S19). That is, an initial value (A=10), which is higher than the initial value (A=5) given to the host path linked to the standby volume, is given to the host path linked to the active volume.

The management computer 400 references the host path management table 1300 and acquires the source volume ID and the port ID related to the PATH n. The management computer 400 determines whether or not one or a plurality of components on the host path are operating normally by collating the source volume ID and the port ID related to the PATH n against either the failure information or the configuration change information acquired in S10 (S20).

Component on the host path, for example, signifies either a device or an electrical circuit disposed on the host path. In this example, the components on the host path include the logical volumes 260M, 260R inside the respective storage devices 200M, 200R, and the communication ports (the host interfaces 211 of FIG. 4) connected to each logical volume 260M, 260R.

The logical volumes 260M, 260R are virtual volumes on the cache memory. Therefore, the cache memories 231 inside the storage devices 200M, 200R actually correspond to components on the host path.

Furthermore, in a case where a switching device or the like is disposed on the first communication network 500, this switching device may also be handled as a component on the host path.

"Based on the status of one or a plurality of components on the host path" corresponds to "based on the status of the first communication network". Furthermore, "based on the status of one or a plurality of components on the host path" may also be stated as "based on the status of the host path".

The management computer 400 determines in S20, for example, whether or not the prescribed criteria, which was stipulated when the cluster configuration was set, has been satisfied. The prescribed criteria, for example, may include whether the communication bandwidth allocated to the communication port is being used, or that the selected component is not disclosed in the failure information.

In a case where any one of the components on the host path is not operating normally (S20: NO), the management computer 400 subtracts a first predetermined value (for example, "3") from the assessment value A (S21). Therefore, for example, in a case where the active path has an initial assessment value A=10 and there is some sort of trouble on the host path, the assessment value becomes A=7 (=10−3). Similarly, in a case where there is some sort of trouble on the passive path (standby path) having an initial assessment value A=5, the assessment value becomes A=2 (=5−3).

In a case where all the components on the host path are operating normally (S20: YES), the management computer 400 skips S21 and moves to S22. Refer to FIG. 13.

The management computer 400 selects the external paths related to the source volumes 260M, 260R selected in S16 by searching the external path management table 1400 (S22).

The management computer 400 acquires the external port ID, target port ID and source volume ID corresponding to the selected external paths, and determines whether or not all of the components (external port, target port, and external volume) on these external paths are operating normally (S23).

"Based on the status of the components on the external path" corresponds to "based on the status of the second communication network". Furthermore, "based on the status of the components on the external path" may also be stated as "based on the status of the external path".

In a case where any one of the components on the external path is not operating normally (S23: NO), the management computer 400 subtracts a second predetermined value (for example, "1") from the assessment value A (S24). In a case where all of the components on the external path are operating normally (S23: YES), the management computer 400 skips S24.

The management computer 400 implements the steps of S14 through S24 for all the host paths selected in S13 (S25).

The management computer 400, based on the respective assessment values computed for the host paths and the host path assessment table 1500 shown in FIG. 14, determines a priority for each host path, and notifies these priorities to the prescribed notification destination (S26). The prescribed notification destination, for example, may include the administrator, the respective storage devices 200M, 200R, and the host 100. Notification may also be made to a plurality of notification destinations, like the administrator and the storage devices 200M, 200R.

The management computer 400 implements the steps of S12 through S26 for each copy pair of the cluster configuration (S27).

FIG. 14 shows a table 1500 for assessing the host path. The host path assessment table 1500 is managed inside the management computer 400 the same as the other tables 1000 through 1400.

The host path assessment table 1500, for example, comprises an assessment value column 1501, a status column 1502, a switchable column 1503, and a priority column 1504.

The assessment value column 1501 manages the final assessment value A of each host path. Values capable of being used as the final assessment value A are "10", "9", "7", "6", "5", "4", "2" and "1"; "8" and "3" do not exist. The initial values are "10" and "5", and since the first predetermined value subtracted from the initial value is "3" and the second predetermined value subtracted from the initial value is "1", the final assessment value A is limited to the eight values mentioned above. In a case where the numerical value of the initial value, the first predetermined value and the second predetermined value change, the value capable of being used as the final assessment value will also change.

The status column 1502 shows the status of each host path. In this example, whether the host path is an active path or a standby path, whether or not the components on the host path are normal, and whether or not the components on the external path are normal are used as the indices for denoting the status of the host path.

A case in which the final assessment value for the host path is "10" signifies a status in which this host path is an active path, all the components on the host path are operating normally, and, in addition, all the components on the external path corresponding to the host path are operating normally.

A case in which the final assessment value for the host path is "9" signifies a status in which this host path is an active path and all the components on the host path are operating normally, but a problem has occurred in at least one of the components on the external path corresponding to the host path.

A case in which the final assessment value for the host path is "7" signifies a status in which this host path is an active path, a problem has occurred in at least one of the components on the host path, and all the components on the external path corresponding to the host path are operating normally.

A case in which the final assessment value for the host path is "6" signifies a status in which this host path is an active path, a problem has occurred in at least one of the components on the host path, and a problem has occurred in any one of the components on the external path corresponding to the host path.

In the case of a status in which the final assessment value is "5", "4", "2", or "1", the status is the same as in the cases when the above-described final assessment value is "10", "9", "7" or "6", except for the difference between the active path and the standby path.

The switchable column 1503 shows whether or not switching to the host paths is permitted. That is, information denoting whether or not the host paths are capable of being used is set in the switchable column 1503.

The priority column 1504 shows the priority set for each host path. In the example shown in FIG. 14, there are three priorities: "1", "2" and "blocked". Priority "1" is the highest priority, and denotes a host path that is selected on a top priority basis. Priority "2" is the next highest priority, and denotes the host path that is selected in a case where the host path having the highest priority has failed.

"Blocked" signifies that use of this host path is not permitted. "Blocked" is set for the host path for which "No" has been set in the switchable column 1503. "Blocked" may be considered the lowest priority.

In this way, this example computes assessment values so that the priority of the active path is higher than the priority of the standby path, and, in addition, configures the host path assessment table 1500. Therefore, it is possible to increase the likelihood that an active path that is currently in use will be able to continue to be used as-is, and to hold failovers from the active path to the standby path in check.

In a case where a plurality of host paths having equivalent priorities exist, the alternate path program 112 selects and uses any one host path. For example, in a case where there are a plurality of active paths having a priority of "1", the alternate path program 112 selects any one active path in order from the smallest path ID. The alternate path program 112 prohibits the use of a host path that has been set to "blocked".

According to this example, which is configured like this, the respective host paths are reassessed and the priorities of the host paths are reset based on the status of each host path on the first communication network 500 and the status of each external path on the second communication network. Therefore, in a case where a failure of some sort has occurred, it is possible to quickly switch to a more effective host path. In accordance with this, it is possible to enhance the storage system's fault tolerance.

In this example, rather than continuing to use the priority that was set at initial setting time as-is, the respective host paths are reassessed and priorities are reset either when a failure occurs or when the configuration of the storage system is changed. In most cases, the configuration of a storage system that has been operated for a long period of time will differ from the initial configuration of the storage system. Therefore, there are cases in which the initially set priority is not necessarily the optimum priority for the current storage system. With regard to this, in this example, it is possible to enhance the fault tolerance of the storage system at a more appropriate timing as the priorities of the respective host paths are dynamically changed in accordance with either a failure or a configuration change in the storage system.

Example 2

A second example will be explained by referring to FIGS. 15 and 16. This example corresponds to a variation of the first example. Therefore, the explanation will focus on the differences with the first example. In this example, a plurality of host path assessment tables 1500 are prepared and switched in accordance with the cache hit ratio.

The storage devices 200M, 200R are able to process an I/O from the host 100 using the cache memory 231. In a case where the size of the cache memory 231 is larger than the size of the volume being used by the host 100 business application 111, it is possible to store all of the data used by the business application 111 on the cache memory 231. In accordance with this, the cache hit ratio becomes 100%.

In a case where the cache hit ratio is 100%, the storage devices 200M, 200R are able to use the data on each cache memory 231 to process a write command or a read command issued by the host 100.

That is, in a case where the cache hit ratio is 100%, the storage devices 200M, 200R are able to process the I/O from the host 100 and return this processing result to the host 100 without accessing the external volume 360.

Accordingly, in this example, a second host path assessment table 1500(2) is prepared in addition to the host path assessment table 1500 described in the first example. So as to be able to clearly distinguish between the two tables here, the host path assessment table 1500 described in the first example, will be called the first host path assessment table 1500(1). An example of the configuration of the second host path assessment table 1500(2) will be described further below.

FIG. 15 shows a process for switching the host path assessment table. This process is executed by the network path management program 411 of the management computer 400. For the sake of convenience, this process will be explained by giving the management computer 400 as the entity that performs the operation.

The management computer 400 determines whether or not the cache hit ratio is 100% each time an I/O from the host 100 is processed (S30). In a case where the cache hit ratio is not 100% (S30:NO), the management computer 400 selects the first host path assessment table 1500(1) shown in FIG. 14 (S31). The management computer 400 uses the first host path assessment table 1500(1) to set the priority for each host path.

By contrast, in a case where the cache hit ratio is 100% (S30:YES), the management computer 400 selects the second host path assessment table 1500(2). The management computer 400 uses the second host path assessment table 1500(2) to set the priority for each host path.

FIG. 16 shows an example of the configuration of the second host path assessment table 1500(2). The second host path assessment table 1500(2) comprises columns 1501 through 1504 the same as the first host path assessment table 1500(1). The differences with the first host path assessment table 1500(1) are the switchable column 1503 and the priority column 1504.

As described above, in a case where the cache hit ratio is 100%, the storage devices 200M, 200R are able to process an I/O from the host 100 with only the data stored in the cache memory 231, and need not access the external volume 360.

Accordingly, in this example, in the second host path assessment table 1500(2), "Yes" is set for the host path for which the corresponding external path is not normal, and this host path is able to be used.

Therefore, in this example, the priority is set without blocking the host path for which a problem has occurred on the external path only. A priority that is lower than the priority for a completely normal host path is set for the host path for which a problem has occurred only on the corresponding external path.

In the example shown in the drawing, the priority of the completely normal host path is "1", and the priority of the active path for which a problem has occurred only on the corresponding external path becomes "2". The priority of the completely normal standby path is "3", and the priority of the standby path for which a problem has occurred only on the corresponding external path becomes "4".

An important point is the fact that the priority of an active path having a problem only on the external path is set higher than that of the completely normal standby path. In accordance with this, it is possible to select the host path in order from the active side paths, and to curb the generation of a failover.

Configuring this example like this exhibits the same effect as the first example. In addition, in this example, in the case of a cache hit ratio of 100%, it is possible to switch from the first host path assessment table 1500(1) to the second host path assessment table 1500(2), and to use a host path that only has a problem on the external path. Therefore, it is possible to more appropriately manage the host path.

Example 3

A third example will explained by referring to FIGS. 17 and 18. In this example, a program 2360 for managing the communication path is incorporated into the first storage device 200M, and the priority is notified to the host 100 when responding to a query from the host 100.

FIG. 17 is a diagram showing the overall configuration of the storage system in accordance with this example. In this example, the management computer 400 has been eliminated. The functions of the management computer 400 are distributed among the storage devices 200M, 200R.

The network path management program 2360 and a priority notification program 2322M are disposed in the first storage device 200M. Another priority notification program 2322R is disposed in the second storage device 200R.

The network path management program 2360 exhibits the same functions as the network path management program 411 described in the first example. That is, the network path management program 2360 sets a priority for each host path based on the status of the first communication network (the status of the components on the host path), and the status of the second communication network (the status of the components on the external path).

The network path management program 2360 notifies the priority notification programs 2322M, 2322R of the priority that has been set. The priority notification programs 2322M, 2322R, in response to a path status query from the host 100, notify the host 100 of the priority notified from the network path management program 2360.

FIG. 18 is a flowchart showing a process in which the storage devices 200M, 200R notify the host 100 of the priorities of the respective host paths. This process is executed by the priority notification programs 2322M, 2322R. In the following explanation, the storage device will be given as the entity performing the operation.

The storage device receives the priorities of the respective host paths related to its own device from the network path management program 2360 (S40). The storage device stores the received priorities in the memory (S41). The storage device overwrites the old priorities of the respective host paths with the new priorities.

The host 100 either regularly or irregularly queries the storage device as to the status the host path. A host path status query is called a path health check in this example. In a case where a path health check occurs (S42: YES), the storage device notifies the host 100 of the latest priorities stored in the memory in response to the path health check (S43).

Configuring this example like this exhibits the same effect as the first example. In addition, in this example, it is possible for the storage devices 200M, 200R to notify the host 100 of the priorities of the respective host paths in response to a query from the host 100.

The present invention is not limited to the embodiment described above. A person with ordinary skill in the art, for example, will be able to make various additions and changes so as to appropriately combine the respective examples described above without departing from the scope of the present invention. For example, the configuration may combine the first example and the third example so that the priorities are notified to the respective storage devices from the management computer and, in response to a query from the host, the respective storage devices notify the host of the priorities.

REFERENCE SIGNS LIST

100 Host computer
111 Application program
112 Alternate path program
200M First storage device 200R Second storage device
231M, 231R Cache memory
260M First logical volume
260R Second logical volume
300 External storage device
360 External volume
400 Management computer
500 First communication network
600 Second communication network

The invention claimed is:

1. A storage system comprising:
a first storage device, which is coupled to a host computer via a first communication network;
a second storage device, which is coupled to the host computer via the first communication network, and, in addition, is communicably coupled to the first storage device;
a third storage device, which is coupled to the first storage device and the second storage device via a second communication network; and
a management computer, which is communicably coupled to the host computer, the first storage device, the second storage device and the third storage device, wherein
the first storage device comprises: a first logical volume, which is provided so as to be able to be used by the host computer; a first cache memory for temporarily storing data of the first logical volume; and a plurality of first communication paths, which are provided on the first communication network for coupling the host computer and the first logical volume,
the second storage device comprises: a second logical volume, which is provided so as to be able to be used by the host computer, and which forms a copy pair with the first logical volume; a second cache memory for temporarily storing data of the second logical volume; and a plurality of second communication paths, which are provided on the first communication network to couple the host computer and the second logical volume,
the third storage device comprises a third logical volume, which is associated with the first logical volume and the second logical volume, has a real storage area that is commonly associated with a virtual storage area of the first logical volume and a virtual storage area of the second logical volume, and stores data written into the first logical volume and the second logical volume,
the management computer, based on a status of the first communication network and a status of the second communication network, sets a first priority for each of the first communication paths and a second priority for each of the second communication paths, and notifies an administrator who uses either the host computer or the management computer of the set first priorities and the set second priorities respectively, wherein
the management computer sends and stores the set respective first priorities in the first storage device, and, in addition, sends and stores the set respective second priorities in the second storage device,
the first storage device, in a case where the host computer queries about the statuses of the respective first communication paths, notifies the host computer of the respective first priorities,
the second storage device, in a case where the host computer queries about the statuses of the respective second communication paths, notifies the host computer of the respective second priorities,
the host computer selects a communication path to be used based on the respective first priorities notified from the first storage device and the respective second priorities notified from the second storage device,
the management computer, based on a communication path assessment table showing the relationship between the respective first priorities, the respective second priorities, and assessment values, which are computed for the respective first communication paths and the respective second communication paths, sets the respective first priorities and the respective second priorities so as to prioritize the communication path currently being used from among the respective first communication paths and the respective second communication paths,
wherein a first assessment table and a second assessment table are included in the respective communication path assessment tables,
the management computer, in a case where the cache hit ratio denoting what proportion of data, which is requested by the host computer, is stored in the first cache memory, is less than a predetermined value, selects the first assessment table included in the respective communication path assessment tables, and in a case where the cache hit ratio is equal to or greater than the predetermined value, selects the second assessment table included in the respective communication path assessment tables, wherein
the first assessment table is configured
such that the priority of a first active communication path, which is an active side communication path that is currently being used from among the respective first communication paths and the respective second communication paths, and for which both the status of the first communication network and the status of the second communication network are normal, constitutes the highest priority,
such that the priority of a first passive communication path, which is a passive side communication path that is not currently being used from among the respective first communication paths and the respective second communication paths, and for which both the status of the first communication network and the status of the second communication network are normal, constitutes the lowest priority, and
such that another communication path other than the first active communication path and the first passive communication path is blocked, and
the second assessment table is configured
such that the priority of a first active communication path, which is an active side communication path, and for which both the status of the first communication network and the status of the second communication network are normal, constitutes the highest priority,
such that the priority of a second active communication path, which is an active side communication path, and for which the status of the first communication network is normal and an intermittent failure has occurred in second communication network, constitutes the secondary highest priority,
such that the priority of a first passive communication path, which is a passive side communication path, and for which both the status of the first communication network and the status of the second communication network are normal, constitutes the tertiary highest priority,
such that the priority of a second passive communication path, which is a passive side communication path, and for which the status of the first communication network is normal and an intermittent failure has occurred in second communication network, constitutes the lowest priority, and such that another communication path other than the first active communication path, the second active communication path, the first passive communication path and the second passive communication path is blocked.

2. The storage system according to claim 1, wherein the management computer sets the respective first priorities and the respective second priorities so as to prioritize the communication path that is currently being used from among the respective first communication paths and the respective second communication paths.

3. The storage system according to claim 1, wherein the management computer is disposed in either the first storage device or the second storage device.

4. The storage system according to claim 1, wherein the management computer sends to the host computer the set first priorities and the set second priorities respectively.

5. A communication path management method for a storage system having:

a first storage device, which is coupled to a host computer via a first communication network;

a second storage device, which is coupled to the host computer via the first communication network, and, in addition, is communicably coupled to the first storage device;

a third storage device, which is coupled to the first storage device and the second storage device via a second communication network; and a management computer, which is communicably coupled to the host computer, the first storage device, the second storage device and the third storage device, the first storage device having: a first logical volume, which is provided so as to be able to be used by the host computer; a first cache memory for temporarily storing data of the first logical volume; and a plurality of first communication paths, which are provided on the first communication network to couple the host computer and the first logical volume, the second storage device having: a second logical volume, which is provided so as to be able to be used by the host computer, and which forms a copy pair with the first logical volume; a second cache memory for temporarily storing data of the second logical volume; and a plurality of second communication paths, which are provided on the first communication network to couple the host computer and the second logical volume, the third storage device having a third logical volume, which is associated with the first logical volume and the second logical volume, has a real storage area that is commonly associated with a virtual storage area of the first logical volume and a virtual storage area of the second logical volume, and stores data written into the first logical volume and the second logical volume, the method comprising:

based on a status of the first communication network and a status of the second communication network, setting by the management computer first priorities for the first communication paths respectively and second priorities for the second communication paths respectively;

sending and storing the set respective first priorities in the first storage device;

sending and storing the set respective second priorities in the second storage device;

by the first storage device, in a case where the host computer queries about the statuses of the respective first communication paths, notifying the host computer of the respective first priorities;

by the second storage device, in a case where the host computer queries about the statuses of the respective second communication paths, notifying the host computer of the respective second priorities;

by the host computer, selecting a communication path to be used based on the respective first priorities notified from the first storage device and the respective second priorities notified from the second storage device;

by the management computer, based on a communication path assessment table showing the relationship between the respective first priorities, the respective second priorities, and assessment values, which are computed for the respective first communication paths and the respective second communication paths, setting the respective first priorities and the respective second priorities so as to prioritize the communication path currently being used from among the respective first communication paths and the respective second communication paths;

by the management computer, wherein a first assessment table and a second assessment table are included in the respective communication path assessment tables, in a case where the cache hit ratio denoting what proportion of data, which is requested by the host computer, is stored in the first cache memory, is less than a predetermined value, selecting the first assessment table included in the respective communication path assessment tables, and in a case where the cache hit ratio is equal to or greater than the predetermined value, selecting the second assessment table included in the respective communication path assessment tables;

by the management computer, setting the priority of a first active communication path in the first assessment table, which is an active side communication path that is currently being used from among the respective first communication paths and the respective second communication paths, and for which both the status of the first communication network and the status of the second communication network are normal, to the highest priority;

by the management computer, setting the priority of a first passive communication path in the first assessment table, which is a passive side communication path that is not currently being used from among the respective first communication paths and the respective second communication paths, and for which both the status of the first communication network and the status of the second communication network are normal, to the lowest priority;

by the management computer, in the first assessment table, setting as blocked another communication path other than the first active communication path and the first passive communication path;

by the management computer, setting the priority of a first active communication path in the second assessment table, which is an active side communication path, and for which both the status of the first communication network and the status of the second communication network are normal, to the highest priority;

by the management computer, setting the priority of a second active communication path in the second assessment table, which is an active side communication path, and for which the status of the first communication network is normal and an intermittent failure has occurred in second communication network, to the secondary highest priority;

by the management computer, setting the priority of a first passive communication path in the second assessment table, which is a passive side communication path, and for which both the status of the first communication network and the status of the second communication network are normal, to the tertiary highest priority;

by the management computer, setting the priority of a second passive communication path in the second assessment table, which is a passive side communication path, and for which the status of the first communication network is normal and an intermittent failure has occurred in second communication network, to the lowest priority; and by the management computer, in the second assessment table, setting as blocked another communication path other than the first active communication path, the second active communication path, the first passive communication path and the second passive communication path.

6. The storage system according to 2, wherein
the management computer, in a case where either a failure or a configuration changes has occurred in any of the first storage device, the second storage device or the third storage device, acquires the status of the first communication network and the status of the second communication network, and based on these acquired the first communication network status and the second communication network status, sets the first priorities of the first communication paths respectively and the second priorities of the second communication paths respectively, and notifies the host computer of the set respective first priorities and the set respective second priorities.

7. A storage system comprising:
a first storage device, which is coupled to a host computer via a first communication network:
a second storage device, which is coupled to the host computer via the first communication network, and, in addition, is communicably coupled to the first storage device;
a third storage device, which is coupled to the first storage device and the second storage device via a second communication network; and
a management computer, which is communicably coupled to the host computer, the first storage device, the second storage device and the third storage device, wherein
the first storage device comprises: a first logical volume, which is provided so as to be able to be used by the host computer; a first cache memory for temporarily storing data of the first logical volume; and a plurality of first communication paths, which are provided on the first communication network for coupling the host computer and the first logical volume,
the second storage device comprises: a second logical volume, which is provided so as to be able to be used by the host computer, and which forms a copy pair with the first logical volume; a second cache memory for temporarily storing data of the second logical volume; and a plurality of second communication paths, which are provided on the first communication network to couple the host computer and the second logical volume,
the third storage device comprises a third logical volume, which is associated with the first logical volume and the second logical volume, has a real storage area that is commonly associated with a virtual storage area of the first logical volume and a virtual storage area of the second logical volume, and stores data written into the first logical volume and the second logical volume, and the management computer, based on a status of the first communication network and a status of the second communication network, sets a first priority for each of the first communication paths and a second priority for each of the second communication paths, and notifies an administrator who uses either the host computer or the management computer of the set first priorities and the set second priorities respectively, wherein (1) the first storage device stores write data received from the host computer in the first cache memory, and subsequently transfers and stores this write data in the second cache memory, and furthermore transfers and stores the write data that was stored in the first cache memory in the third logical volume, and with notification being issued to the second storage device to the effect that the write data has been stored in the third logical volume, synchronizes storage contents of the first cache memory and storage contents of the second cache memory, (2) the management computer, in a case where either a failure or a configuration change occurs in any of the first storage device, the second storage device or the third storage device, acquires the status of the first communication network and the status of the second communication network, and based on one communication path assessment table selected from among a plurality of communication path assessment tables showing the relationship between the respective first priorities, the respective second priorities, and assessment values, which are computed for the respective first communication paths and the respective second communication paths, sets the respective first priorities and the respective second priorities so as to prioritize the communication path currently being used from among the first communication paths and the second communication paths, and notifies the first storage device and the second storage device of the set first priorities and the set second priorities respectively, (3) the first storage device stores the respective first priorities notified from the management computer, and in a case where the host computer queries about the statuses of the respective first communication paths, notifies the host computer of the first priority related to this query, (4) the second storage device stores the respective second priorities notified from the management computer, and in a case where the host computer queries about the statuses of the respective second communication paths, notifies the host computer of the second priority related to this query, (5) the host computer, either regularly or in accordance with an instruction, queries about the first storage device regarding the statuses of the respective first communication paths, and, in addition, queries the second storage device regarding the statuses of the respective second communication paths, and based on the respective first priorities received from the first storage device and the respective second priorities received from the second storage device, selects and uses the communication path having the highest priority, and furthermore, (6) the management computer,
in a case where the cache hit ratio denoting what proportion of data, which is requested by the host computer, is stored in the first cache memory, is less than a predetermined value, selects a first assessment table, which is included in the respective communication path assessment tables, and in a case where the cache hit ratio is equal to or greater than the predetermined value, selects a second assessment table, which is included in the respective communication path assessment tables, (7) the first assessment table is configured
such that the priority of a first active side communication path, which is an active communication path that is currently being used from among the respective first communication paths and the respective second communication paths, and for which both the status of the first communication network and the status of the second communication network are normal, constitutes the highest priority, and furthermore such that the priority of a first passive communication path, which is a passive side communication path that is currently being used from among the respective first communication paths and the respective second communication paths, and for which both the status of the first communication network and the status of the second communication network are normal, constitutes the lowest priority, and furthermore, such that another communication path other than the first active communication path and the first passive communication path is blocked, (8) the second assessment table is configured
such that the priority of a first active communication path, which is an active side communication path, and for which both the status of the first communication network and the status of the second communication network are normal, constitutes the highest priority, furthermore such that the priority of a second active communication path, which is an active side communication path, and for which the status of the first communication network is normal and an intermittent failure has occurred in second communication network, constitutes the secondary highest priority, furthermore such that the priority of a first passive communication path, which is a passive side communication path, and for which both the status of the first communication network and the status of the second communication network are normal, constitutes the tertiary highest priority, furthermore such that the priority of a second passive communication path, which is a passive side communication path, and for which the status of the first communication network is normal and an intermittent failure has occurred in second communication network, constitutes the lowest priority, and furthermore, such that another communication path other than the first active communication path, the second active communication path, the first passive communication path and the second passive communication path is blocked.

* * * * *